(12) United States Patent
Parés Calaf et al.

(10) Patent No.: US 10,704,902 B2
(45) Date of Patent: Jul. 7, 2020

(54) SURVEYING POLE

(71) Applicant: FUNDACIÓ CENTRE TECNOLOGIC DE TELECOMUNICACIONS DE CATALUNYA (CTTC), Barcelona (ES)

(72) Inventors: M. Eulàlia Parés Calaf, Barcelona (ES); David Calero Scanlan, Barcelona (ES); Enric Fernández Murcia, Barcelona (ES)

(73) Assignee: FUNDACIÒ CENTRE TECNOLOGIC DE TELECOMMUNICACIONS DE CATALUNYA (CTTC), Barcelona (ES)

( * ) Notice: Subject to any disclaimer, the term of this patent is extended or adjusted under 35 U.S.C. 154(b) by 32 days.

(21) Appl. No.: 16/075,912

(22) PCT Filed: Dec. 30, 2015

(86) PCT No.: PCT/EP2015/081433
§ 371 (c)(1),
(2) Date: Aug. 6, 2018

(87) PCT Pub. No.: WO2017/114577
PCT Pub. Date: Jul. 6, 2017

(65) Prior Publication Data
US 2020/0166338 A1    May 28, 2020

(51) Int. Cl.
*G01C 15/06*    (2006.01)
*G01C 1/02*    (2006.01)
(Continued)

(52) U.S. Cl.
CPC ............... *G01C 1/02* (2013.01); *G01C 15/06* (2013.01); *G01C 15/12* (2013.01); *G01C 21/165* (2013.01); *G01S 19/51* (2013.01)

(58) Field of Classification Search
CPC ......... G01C 1/02; G01C 15/06; G01C 21/165
(Continued)

(56) References Cited

U.S. PATENT DOCUMENTS 5,929,807 A    7/1999    Viney et al.
6,633,256 B2 *  10/2003    Zhdanov ................ G01C 15/00
                                                         342/357.32
(Continued)

FOREIGN PATENT DOCUMENTS

EP    2722647 A1    4/2014

OTHER PUBLICATIONS

International Search Report and Written Opinion, PCT/EP2015/081433, dated Jul. 10, 2016.
(Continued)

*Primary Examiner* — George B Bennett
(74) *Attorney, Agent, or Firm* — Entralta P.C.; Justin G. Sanders; Peter D. Weinstein

(57) ABSTRACT

Current GNSS-inclinable surveying pole systems rely on magnetometer sensors. The use of these types of sensor implies performance degradation when operating near magnetic fields. The invention provides a new approach to ranging pole systems, able to provide requested performance even when working near magnetic fields.

15 Claims, 21 Drawing Sheets

(51) Int. Cl.
*G01S 19/51* (2010.01)
*G01C 15/12* (2006.01)
*G01C 21/16* (2006.01)

(58) Field of Classification Search
USPC .................................................. 33/1 T, 293
See application file for complete search history.

(56) References Cited

U.S. PATENT DOCUMENTS

| | | | | |
|---|---|---|---|---|
| 7,646,339 | B2* | 1/2010 | Green | G01C 15/00 |
| | | | | 342/357.27 |
| 8,698,695 | B2* | 4/2014 | Wyckoff | H01Q 1/085 |
| | | | | 343/878 |
| 2007/0139262 | A1* | 6/2007 | Scherzinger | G01S 19/51 |
| | | | | 342/357.32 |
| 2009/0024325 | A1* | 1/2009 | Scherzinger | G01C 15/06 |
| | | | | 702/5 |
| 2012/0163656 | A1* | 6/2012 | Wang | G01C 15/00 |
| | | | | 382/103 |
| 2015/0268045 | A1* | 9/2015 | Dusha | G01C 15/06 |
| | | | | 33/228 |
| 2017/0176185 | A1* | 6/2017 | Maar | G01C 15/06 |
| 2018/0100931 | A1* | 4/2018 | Kipka | G01S 19/14 |
| 2019/0289821 | A1* | 9/2019 | Martinez-Barreiro | |
| | | | | A01K 11/004 |
| 2020/0025943 | A1* | 1/2020 | Lemaire | G01C 11/06 |

OTHER PUBLICATIONS

International Preliminary Report on Patentability, PCT/EP2015/081433, dated Dec. 7, 2017.

* cited by examiner

SURVEYING POLE

This application is a 35 U.S.C. § 371 US national stage entry of International Application number PCT/EP2015/081433, filed Dec. 30, 2015. The contents of the aforementioned application are incorporated by reference herein.

TECHNICAL FIELD

The present invention relates generally to the field of topographic surveying poles, and in particular, to a method and device for improved position determination by a surveying pole, in particular, a surveying pole with improved robustness and extended availability.

BACKGROUND OF THE INVENTION

Surveying poles are topographic instruments used to measure different geographic parameters, such as point positions on the ground, distances as well as angles. Typical applications are position survey markets, buildings, road construction and mapping. Recently, the classical mirror-based surveying pole used for topographic surveying works in outdoor environments has been replaced by GNSS based poles which rely on the aid of the global navigation satellite system GNSS, like the Trimble R8. FIG. 1 depicts a GNSS-based pole 100 which comprises a rod 110 with a bottom end 120 for positioning on a point 140 on the ground which needs to be localized. The top end 130 comprises a GNSS device for determining the geographical coordinates of the GNSS antenna reference point 150. When the pole is completely vertical, the difference in coordinates between the ground point 140 and the GNSS point 150 is equivalent to the height of the pole 160 (approximately the length of the rod). GNSS-based poles are easier to operate because they do not need external equipment for making further measurements as all GNSS electronics are contained within the GNSS device. They also provide fast position computation and, thus a faster topographic survey, than traditional mirror-based systems.

The theoretical basis underlying the surveying pole is to first compute the GNSS antenna position 150 through a geodetic GNSS receiver and subsequently project the point to the ground taking into account the height difference 160. The operation is performed by a user that handles the surveying pole, placing the bottom end 120 on a desired ground point 140 for obtaining its 3D position coordinates. The main drawback is that the pole needs to be completely vertical, therefore it is necessary to level the pole using a level. This requires further handling, takes more time, and can lead to errors.

Unfortunately, even if an excellent verticality is achieved, there are situations that do not allow placing the pole in the required vertical position, and thus, the use of such poles is not possible. Such situations could be due to obstacles, for example, inside or around buildings, tunnel entrances or trees. FIG. 2 depicts such situations, wherein a tree 220 or building 230 obstructs (represented by the cross) the direct line-of-sight between the GNSS device and the satellite system 210.

Surveying pole solutions exist which attempt to solve this problem by allowing the pole to be tilted for determining the ground point coordinates both in vertical and oblique mode. The capability of tilting the pole has the advantage of measuring points that were otherwise inaccessible, like in environmental conditions where a full visibility of the sky is not possible, such as areas obstructed by trees, inside buildings or other obstacle objects. Also, by tilting the pole, it is possible to have a direct line of sight to more satellites than otherwise, and hence a more precise ground point position can be determined.

However, in order to properly perform the ground point projection, the attitude, or orientation, of the tilted pole needs to be determined in order to determine the actual vertical difference between the top and bottom ends of the pole. Thus it is necessary to include additional hardware sensors to measure this pole orientation and compensate for the vertical height difference due to the pole being tilted.

FIG. 3 depicts the three rotation angles defining the attitude, or orientation, of a surveying pole. The first angle θ, the heading or yaw, is the angle which defines a rotation around the vertical z-axis 310. When the pole is pointing north, the heading is zero, however by rotating the pole clockwise or counter-clockwise, a heading is generated. The second angle α, the pitch, is the angle which defines a rotation around the horizontal y-axis 320. When the pole is completely vertical, the pitch is zero, however by moving the pole forward or backward, a pitch is generated. The third angle (3, the roll, is the angle which defines a rotation around the horizontal x-axis 330. When the pole is completely vertical, the roll is zero, however by moving the pole right or left, a roll is generated.

Current GNSS tilt surveying pole solutions estimate the orientation of the pole using magnetometers and inclinometers, like the Trimble R10, necessary to perform GNSS positioning at an angle. FIG. 4 depicts a surveying pole 400 comprising the additional magnetometer and inclinometer components within the GNSS device 410. By using the magnetometer, it is possible to obtain the pole orientation in relation to the magnetic North, that is, the heading. With the use of two orthogonal inclinometers it is possible to determine the remaining two tilt angles (pitch and roll) of the pole in relation to the vertical axis respect to ground. Hence, this solution allows working in tilted mode as all three angles are obtained using a magnetometer and inclinometer.

However, such solutions suffer from critical restrictions due mainly to interference caused by environmental magnetic fields. The strongest electromagnetic fields found in such scenarios are generated by electromagnetic induction, such as existent near railways, electric power stations or near metallic objects, which are typically construction environments where topographical surveys need to be conducted. The electromagnetic fields of the surroundings affect the measurements as these traditional poles sense the magnetic field of the Earth and the measurements are distorted by this interference field, resulting in errors in attitude determination, as well as inaccurate topographical surveys.

Therefore a need exists to effectively solve the above-mentioned problems.

SUMMARY

It is therefore an object of the present invention to provide solutions to the above mentioned problems. In particular, it is an object of the invention to provide GNSS-based positioning, or surveying, poles which can be used both in vertical as well as tilted, or oblique, mode, and which are highly accurate and reliable, even in the presence of electromagnetic fields, or under the influence of strong magnetic fields.

This is achieved by providing a positioning pole comprising a satellite positioning sensor and an inertial sensor. An initialization phase determines the ground point position and absolute heading with respect to the geographic North with high accuracy using inertial data samples corresponding to at least three different pole inclinations. The absolute heading is then used in an operational phase enabling using the pole for new ground point or orientation determinations, however without having to perform a new initialization procedure every time.

When in open spaces, that is, "unmagnetized" scenarios, the improved positioning pole is capable of locating ground points with extremely high accuracy and at least the same accuracy as current topographic systems. However, in half-occluded spaces or spaces with strong electromagnetic fields, where classical GNSS based poles are not capable of operating, the improved pole enables performing speedy positioning with topographic acceptable performance, however without the use of magnetic sensors. Hence, a surveying pole is provided which is more robust (because it is not affected by magnetic fields) and has extended availability (because it can measure where other poles cannot, for example, environments with no or low line-of-sight satellite visibility).

Therefore, it is one object of the present invention to provide an improved positioning pole for position determination.

It is another object of the present invention to provide a method of improved position determination by a positioning pole.

It is another object of the present invention to provide a method of converting conventional topographical poles to an improved positioning pole.

It is another object of the present invention to provide a computer program comprising instructions, once executed on a processor, for performing the steps of a method of improved position determination by a positioning pole.

It is another object of the present invention to provide a computer readable medium comprising instructions, once executed on a processor, for performing the steps of a method of improved position determination by a positioning pole.

The invention provides methods and devices that implement various aspects, embodiments, and features of the invention, and are implemented by various means. The various means may comprise, for example, hardware, software, firmware, or a combination thereof, and these techniques may be implemented in any single one, or combination of, the various means.

For a hardware implementation, the various means may comprise processing units implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the various means may comprise modules (for example, procedures, functions, and so on) that perform the functions described herein. The software codes may be stored in a memory unit and executed by a processor. The memory unit may be implemented within the processor or external to the processor.

Various aspects, configurations and embodiments of the invention are described. In particular the invention provides methods, apparatus, systems, processors, program codes, computer readable media, and other apparatuses and elements that implement various aspects, configurations and features of the invention, as described below.

BRIEF DESCRIPTION OF THE DRAWING(S)

The features and advantages of the present invention will become more apparent from the detailed description set forth below when taken in conjunction with the drawings in which like reference characters identify corresponding elements in the different drawings. Corresponding elements may also be referenced using different characters.

DETAILED DESCRIPTION OF THE INVENTION

Figure 1:
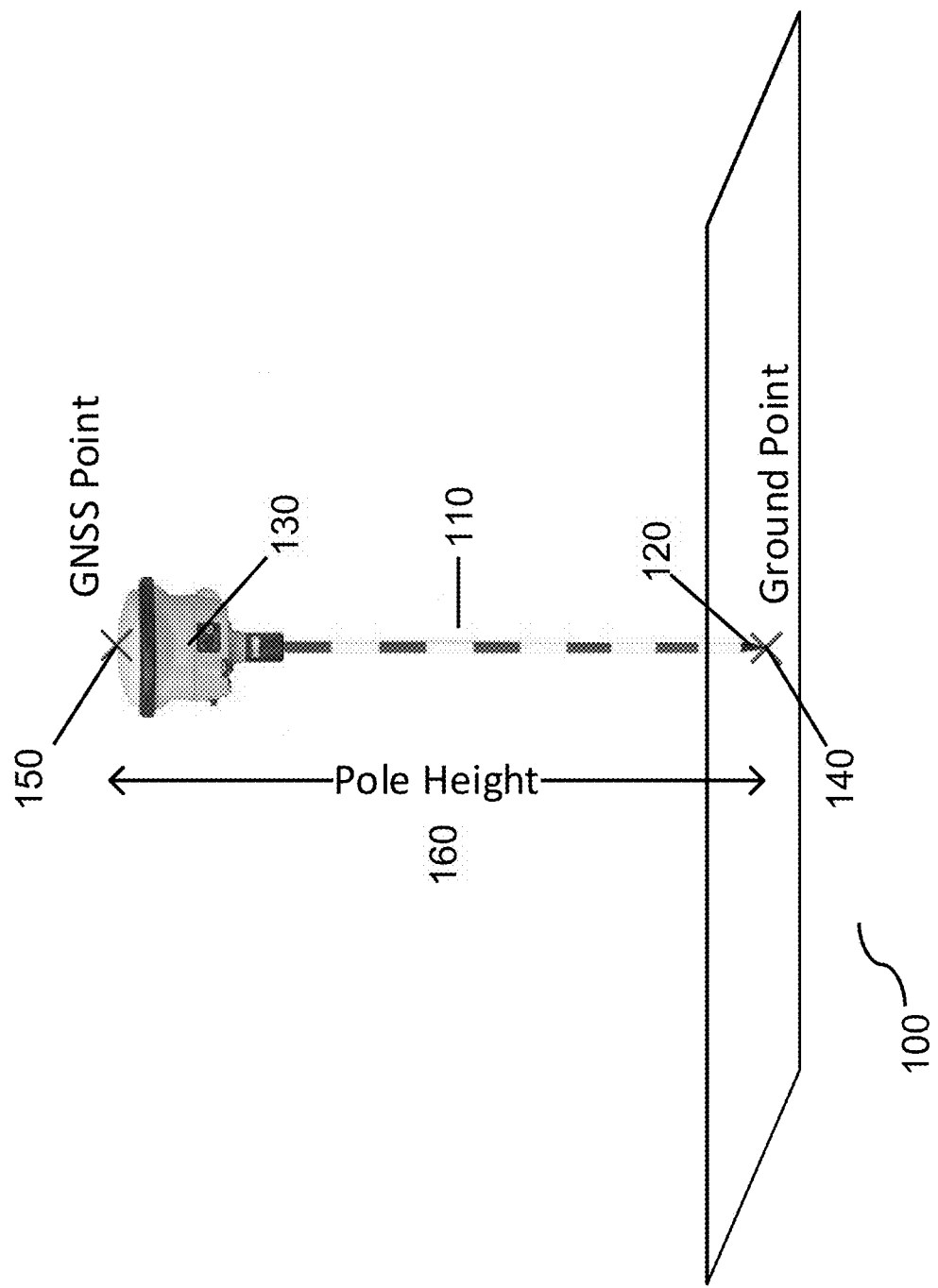
FIG. 1 depicts a conventional GNSS-based surveying pole.
Figure 2:
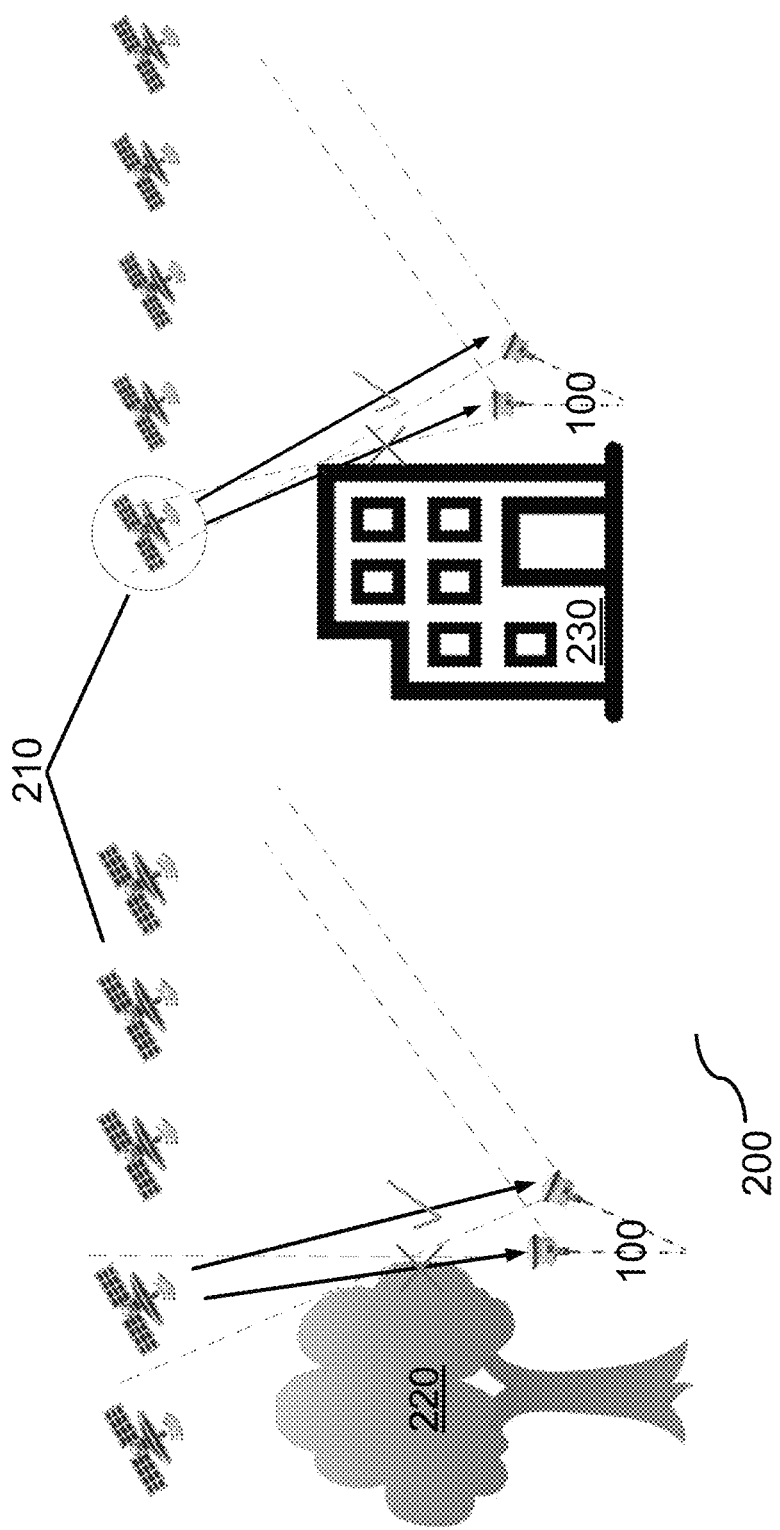
FIG. 2 depicts situations wherein conventional surveying poles can or cannot operate.
Figure 3:
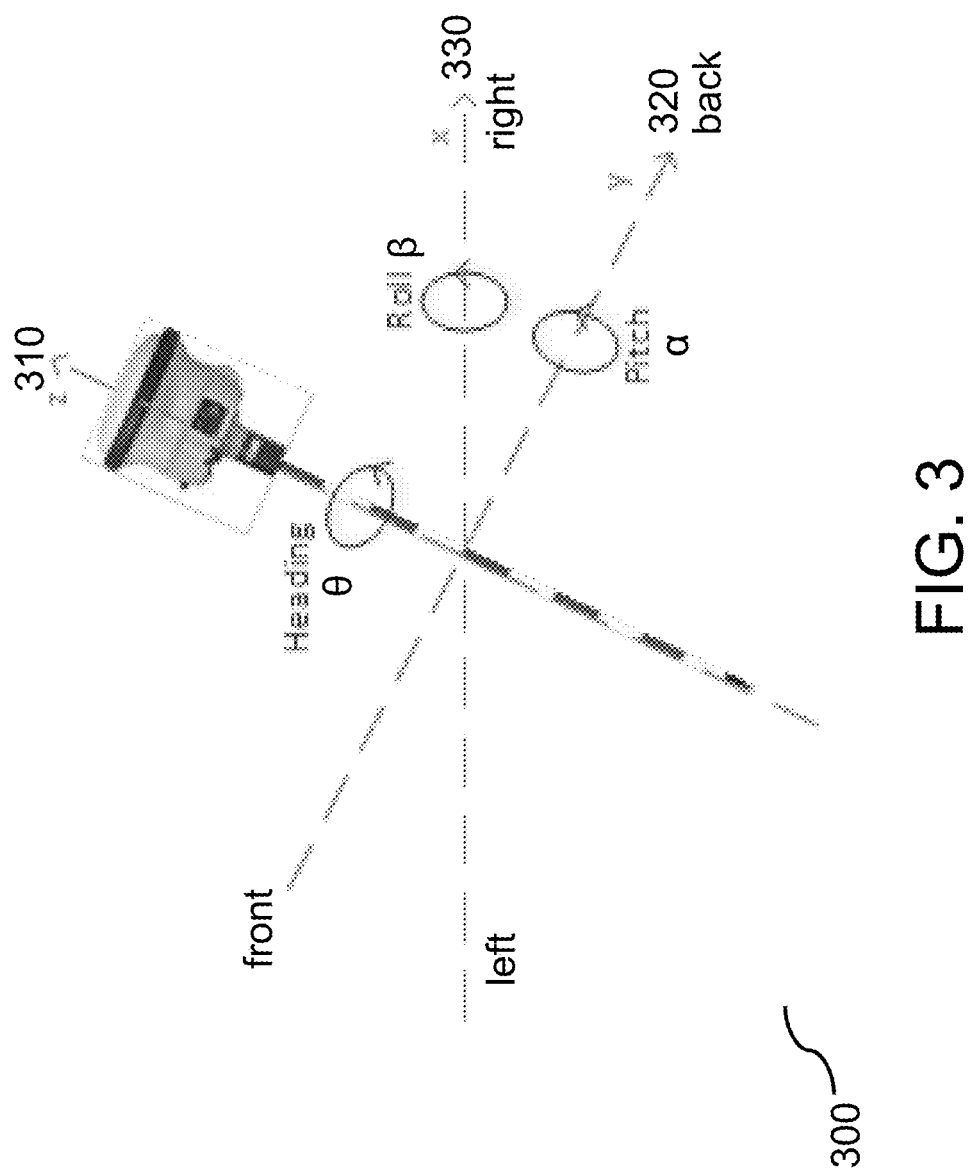
FIG. 3 depicts the different angles defining the orientation of a surveying pole.
Figure 4:
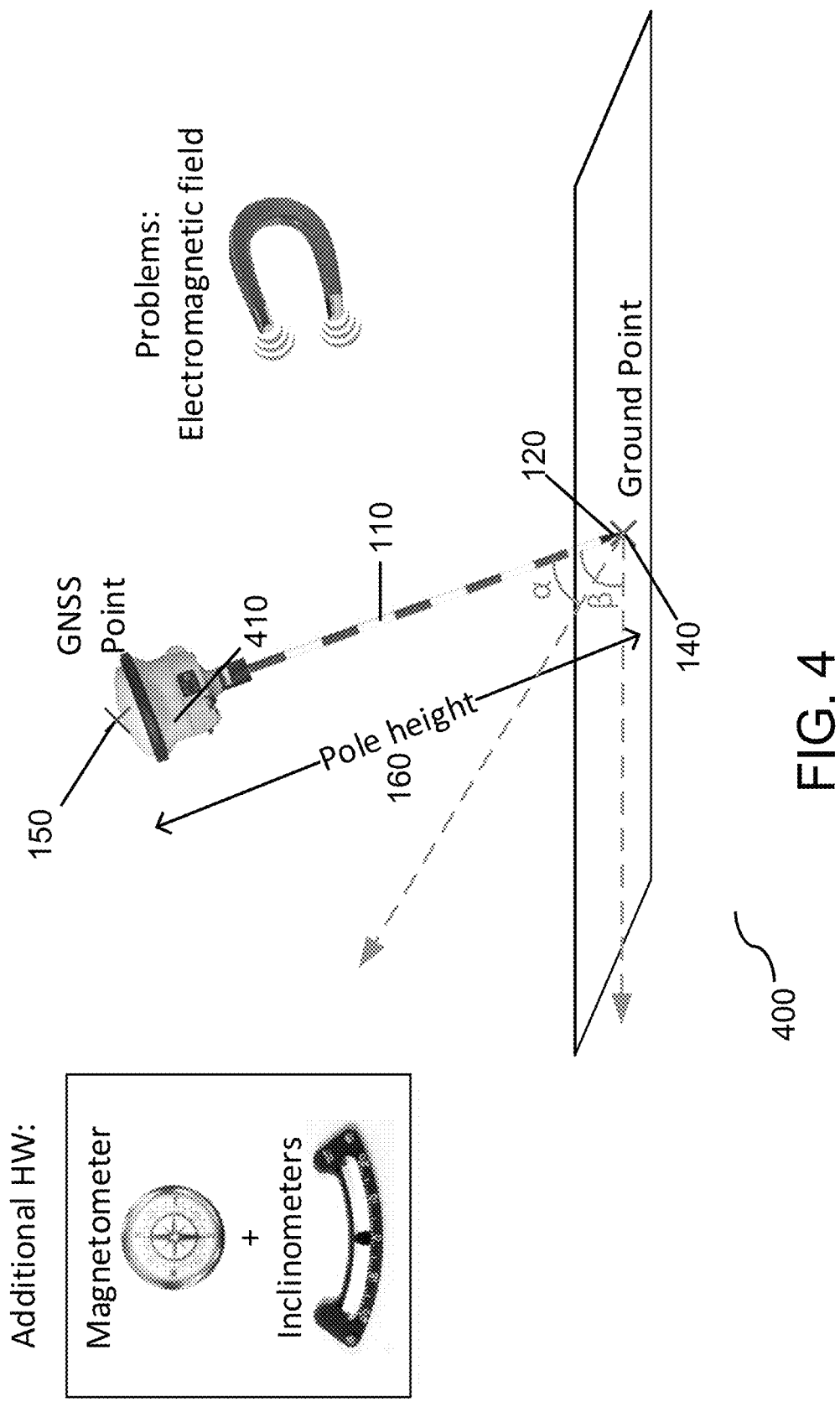
FIG. 4 depicts a surveying pole comprising magnetometers and inclinometers.
Figure 5:
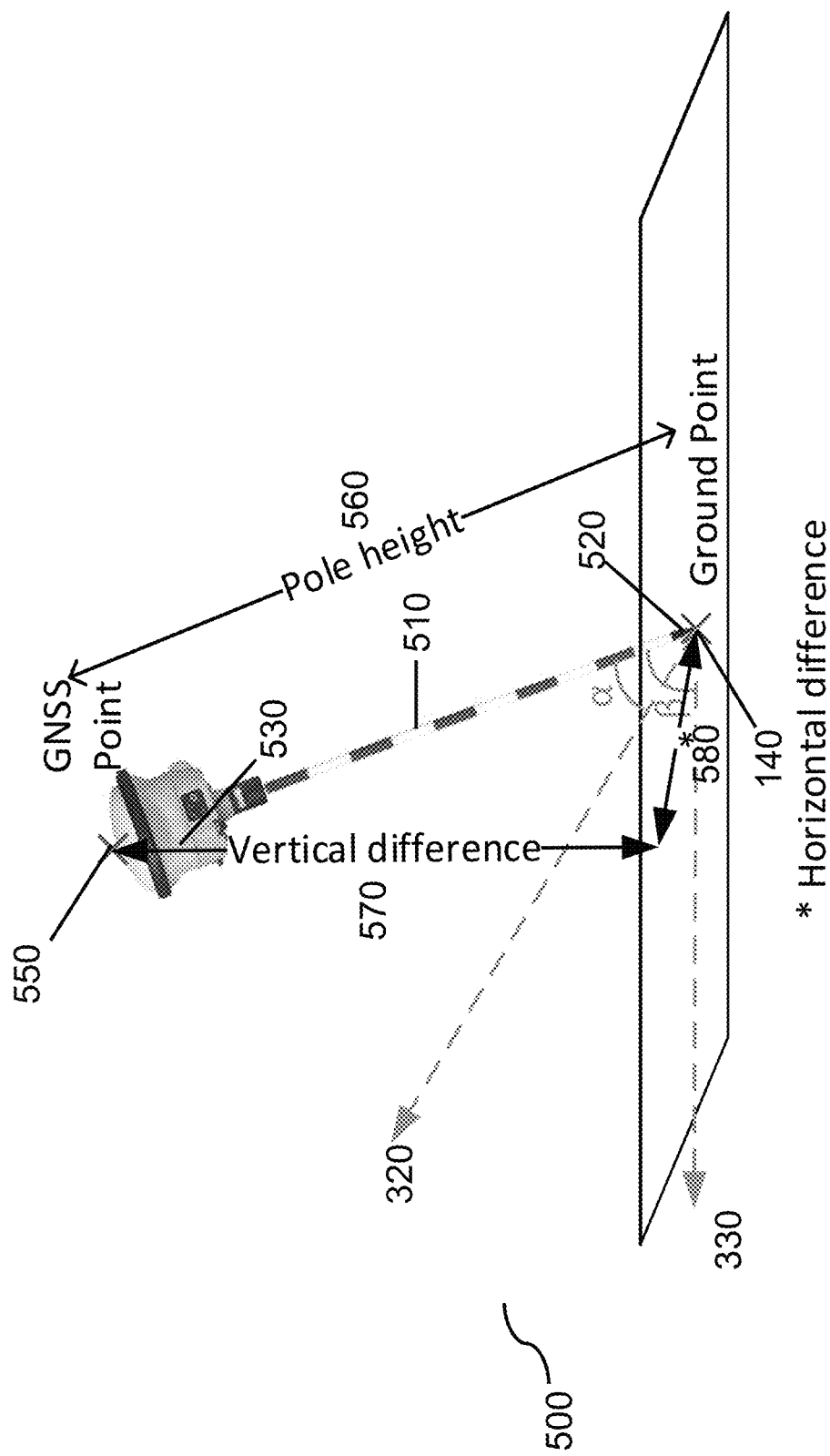
FIG. 5 depicts an improved positioning pole according to the invention.

FIG. 5 depicts an improved positioning pole 500 according to one embodiment of the invention. The pole comprises a rod 510 with a bottom end 520 for positioning on a point 140 on the ground which needs to be localized. The top end 530 comprises a positioning device for determining the orientation angles of the pole and the geodetic coordinates of a reference point 550. The inventors take advantage of the constant length 560 of the rod, the fact that the bottom end 520 is placed on the same ground point 140 during the entire process, and considering the coordinates of the top end 550 are determined by satellite positioning and the relative orientation of the pole by the inertial sensors.

The pole comprises hardware components which operate according to an algorithm, or software, for performing improved position determination. The process is performed iteratively by a Kalman filter, which is initialized by a first information set which is then continually updated periodically sequentially in time. At periodic time intervals, or every time new inertial data or satellite positioning GNSS data is available, the Kalman filter of the positioning device recalculates the orientation angles (from angular velocities) and positions (from linear accelerations).

Figure 6:
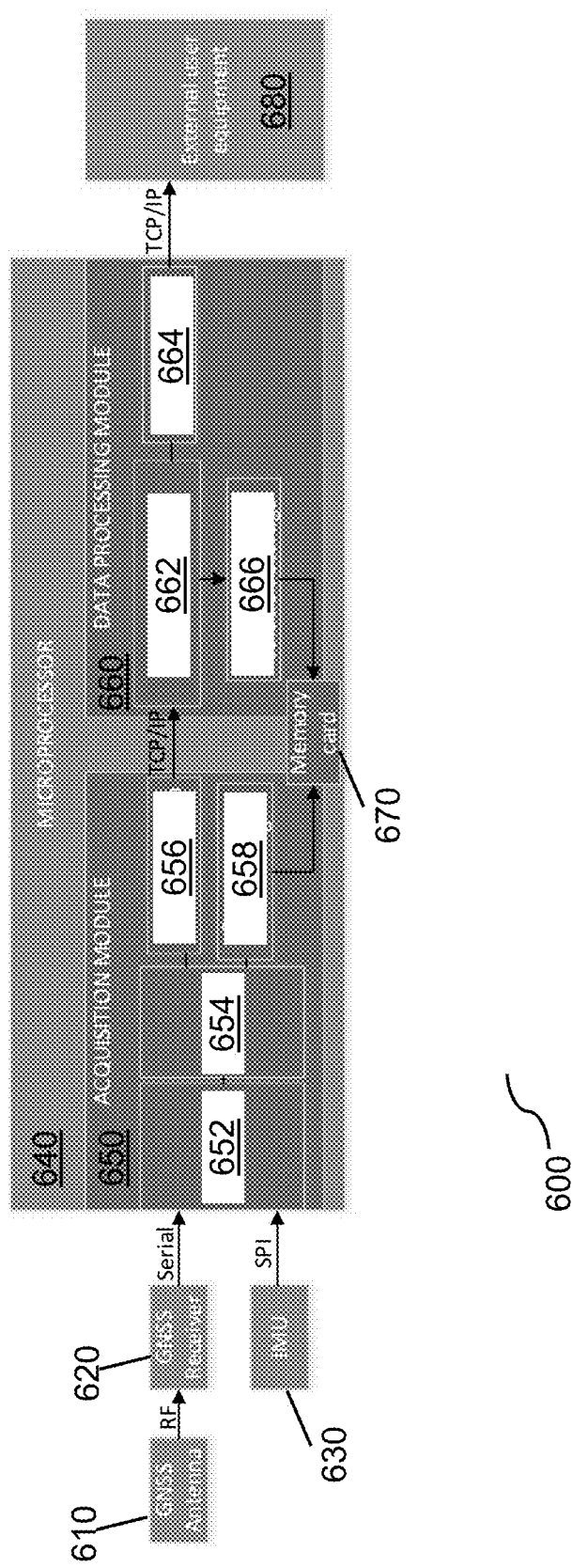
FIG. 6 depicts means for position determination of the improved positioning pole of the invention.

FIG. 6 depicts the means for position determination 600, or positioning device, comprising means for satellite positioning 610, 620, means for inertial sensing 630, processing means 640 and memory means 670. The result of the position determination can be output to external devices 680.

The means for satellite positioning comprises a GNSS antenna 610 connected to a GNSS receiver 620 for communicating with one or more satellites according to the GNSS protocol and receiving raw satellite position data. The raw satellite data is used to determine the GNSS coordinates of the top end by using differential processing. This can be achieved by either using 1) a GNSS receiver including differential processing capabilities, 2) applying real time kinetic corrections in real-time from an RTK processor, or 3) apply such differential processing off-line, in a post-processing stage. Both are connected by a radio frequency RF cable (low attenuation on signals below 2 GHz) and the satellite positioning means is connected to the processing means 640 by a digital serial communication (RS232 or similar). The determination of the geographic coordinates by a GNSS receiver is outside the scope of this invention, and the skilled person can use readily available GNSS receiver as long as they provide the geodetic coordinates of the top end.

The inertial sensing means 630, or inertial sensor, is an inertial measurement unit IMU comprising accelerometers and angular rate sensors, or gyroscopes. It is connected to the processing means 640 via a communication interface, such as a serial-to-parallel interface SPI (or analogous communication channel, analogic or digital). The skilled person can use readily available IMU's as long as they provide the inertial data necessary for subsequently determining the orientation of the positioning pole.

The processing means 640 comprises an acquisition means 650, or acquisition module, and data processing means 660, or data processing module. The acquisition means comprises initialization means 652 for initial ground point position and orientation estimation. The ground point is determined based on the inertial data using mechanization equations. The processing means further comprises timing means 654 for time-tagging the position data as well as the inertial data. The output of the timing means is sent to the communication means 656 for delivering the data to the data processing means 660 via a communication interface, such as the TCP/IP protocol, or similar. A copy of the data is stored locally in memory storage 658 as well as, optionally, in memory means 670, for external post-processing. Internal memory means 670 may be permanently installed or be removably coupled to the processing means 640 and can be, for example, a smart disk SD card.

The timing means 654 provides the reference timing for time tagging the raw data acquired. However this reference clock is quite unstable and therefore needs to be stabilized. The correction is made using the pulse-per-second PPS synchronization signal provided by the GNSS receiver 620. The processor clock drift is compensated for using this PPS signal at one second intervals in order to maintain a good reference time-stamp, resulting in an accurate time tagging.

The data processing means 660 is responsible for determining the ground point position 140 using the data determined from the acquisition means as input to the Kalman filter. This ground point computation is performed by the means for positioning 662 and, optionally, transmitted by communication means 664 to any external device 680, such as human interface or display, via the TCP/IP protocol, or similar. A copy of the computed ground points is stored locally in memory storage 666 as well as, optionally, in memory means 670.

The position of the ground is determined starting from an initial ground point estimation which is a rough ground point position determined based on the coordinates of the GNSS antenna point 550 and the knowledge of the pole length 510. The initial ground point estimation is determined by solving the following least squares problem wherein the antenna point coordinates and the ground point coordinates are related through the pole length. The distance difference between the two points is always the pole length:

$$L=\|Xi-Xg\| \qquad \text{[equation 1]}$$

where L is the (known) pole length 560, Xi are the (known) GNSS antenna geodetic coordinates 550 of ith-step and Xg is the (unknown) geodetic coordinates of the ground point 140 which has to be determined. Next, the ground point is accurately determined by obtaining at least two other ground point estimations at two different pole orientations, or attitudes. This is done by tilting the pole in different directions and estimating the ground point. The final ground point is based on the result of at least three data sets. The at least three data sets provide orientation angle information from the inertial sensor used to determine with certainty the position of the ground point.

An inertial sensor, or inertial measurement unit IMU, is an electronic device that measures and reports specific forces and angular rates exerted on a body, using a combination of three accelerometers and three gyroscopes. An accelerometer measures acceleration forces based on Newton's second law "The acceleration of a body is parallel and directly proportional to the net applied force F and inversely proportional to its mass m". Typically, acceleration units are expressed in meters per second per second (m/s$^2$).

A gyroscope measures angular rotation increments from a reference orientation. Gyroscopes are based on the Coriolis effect, measuring the deflection force (Fc) of moving objects when they are rotating through a reference frame. Typically, gyroscope units are expressed in degrees per second (deg/sec). The accelerometers and gyroscopes are placed in such a way that their measuring axes are orthogonal to each other, being three different axis (x,y,z). The inertial sensor generates inertial data comprising three accelerations (one for each axis) and three gyroscopes (one for each axis).

Inertial data samples are obtained for at least three pole inclinations. From the inertial data at any one inclination, the pitch and roll of the surveying pole may be determined. The pitch angle is determined as the arc sinus of the measured acceleration in the x-axis of the body-frame divided by the constant Earth's gravitational. The roll angle is determined as the arc sinus of the measured acceleration in the y-axis of the body-frame divided by the constant Earth's gravitational. The following equations are examples of these calculations:

$$\alpha = -a\sin(a_x/g) \qquad \text{[equation 2]}$$

$$\beta = a\sin(a_y/g) \qquad \text{[equation 3]}$$

where $\alpha$ is the pitch angle, $\beta$ is the roll angle, $a_x$ is the medium acceleration measured in the x-axis, $a_y$ is the medium acceleration measured in the y-axis and g is the gravity force equal to 9.81 m/s$^2$. Hence the pitch and the roll orientation angles are determined based on medium acceleration data of the x-axis and the y-axis, respectively.

For every inclination of the pole, a plurality of ground point candidates emerge as the plurality of possible intersections of the vertical projection 570 with the horizontal projection 580 of the pole's top end:

$$\text{Vertical projection=Pole height}*\cos(\beta)*\cos(\alpha) \qquad \text{[equation 4]}$$

$$\text{Horizontal projection=Pole height}*\sin(\beta)*\sin(\alpha) \qquad \text{[equation 5]}.$$

The vertical projection is the result of multiplying the pole height 560 with the cosine of the roll and the cosine of the pitch. The horizontal projection is the result of multiplying the pole height 560 with the sine of the roll and the sine of the pitch.

Figure 20:
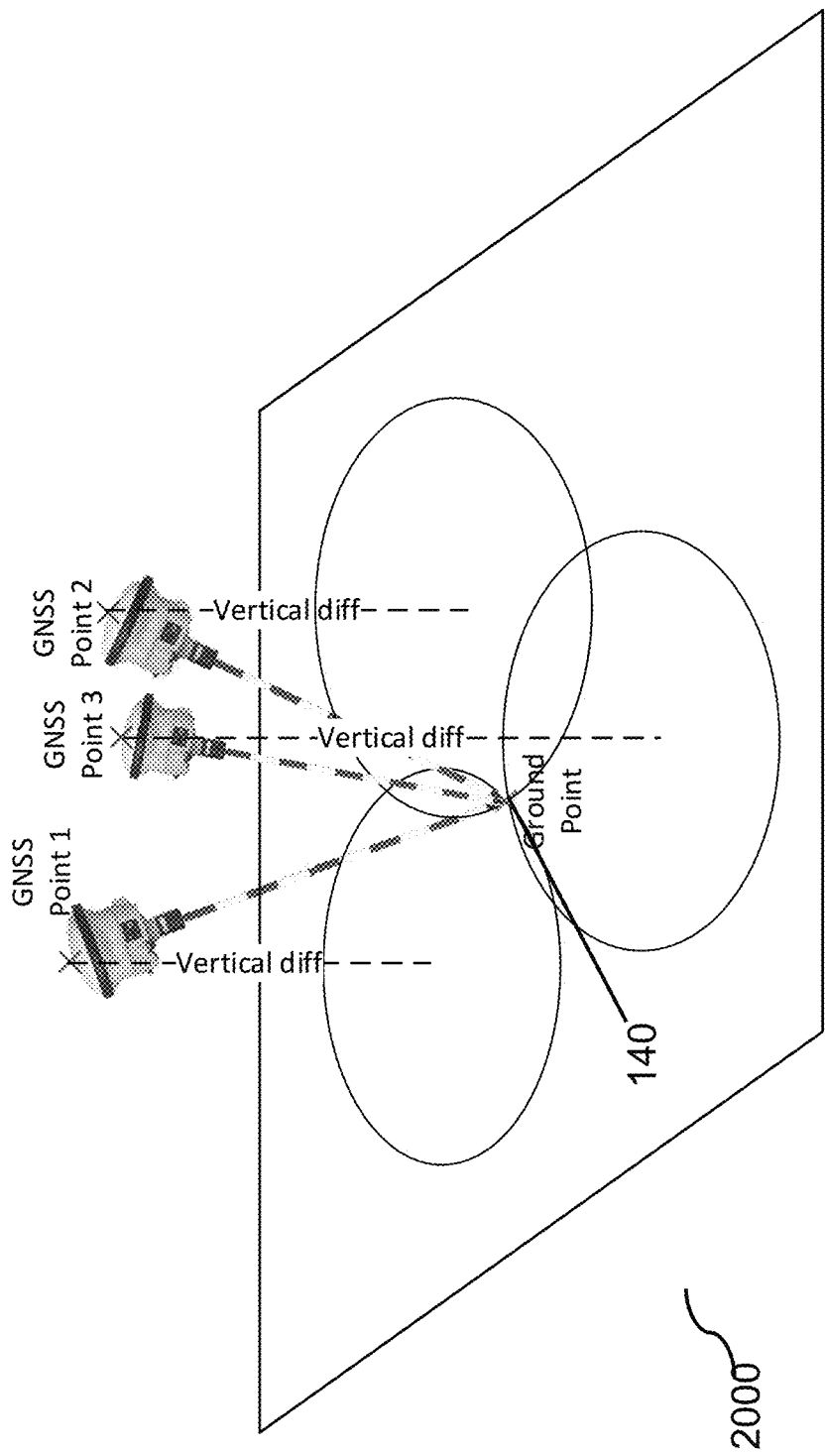
FIG. 20 depicts pole initialization using three different orientation samples.

From this plurality of ground point candidates corresponding to each pole inclination, the final ground point position corresponds to the candidate which is common to, at least three, different pole inclinations, or attitudes. In other words, it is the candidate which coincides with all pole inclinations. FIG. 20 depicts the pole at three different inclinations, or attitudes (GNSS points 1 to 3). The point at which the candidate ground point is the same for all three inclinations is the final ground point 140. In the depiction of FIG. 20, this corresponds with the point of intersection of the three circles, each circle corresponding to the plurality of candidates possible at each pole attitude. Hence, a minimum of three ground point candidates are necessary in order to determine the final ground point value with certainty.

Hence, a position determining device is provided on a surveying pole which functions accurately even in magnetized environments as it does not make us of magnetometers. However, due to its simple design, it is economic and requires minimal processing resources. This determination using the minimum of three sampling points is accurate and also simple and fast.

In case it is desired to determine the position of a second, or further, ground point, it would normally be necessary to repeat the initialization for the new ground points, once for every new ground point. However, in another aspect of the invention, once a first ground point is measured, it is possible to internally track the difference till a new ground point and hence determine the geographic coordinates of new ground points without performing another initialization phase. This is achieved by determining, in the initialization stage, also the absolute heading of the pole with respect to the geographic North. Hence, when in a new position, the new ground point position can be derived based on the previous and the new heading information. Although the pitch and roll may be determined directly from the inertial data, the absolute heading cannot be determined directly, as only relative information is available. Hence, in a next step, the heading, or absolute North, is determined, using the data from the at least three samples as well as the determined ground point.

Hence, a simple user-friendly algorithm permits, in a first initialization phase, any specialized or non-specialized user to initialize the device when in line-of-sight contact with GNSS satellites. In a subsequent operational phase, the user may continue using the surveying pole in environments without line-of-sight contact with satellites, as the internal tracking mechanism permits computing the pitch, roll and heading as well as the geodesic coordinates of the pole at all times. Hence a user-friendly positioning pole is provided which accurately operates in a simple, economic and resource efficient manner even in scenarios with electromagnetic interferences and which do not provide direct contact to satellites.

Figure 21:
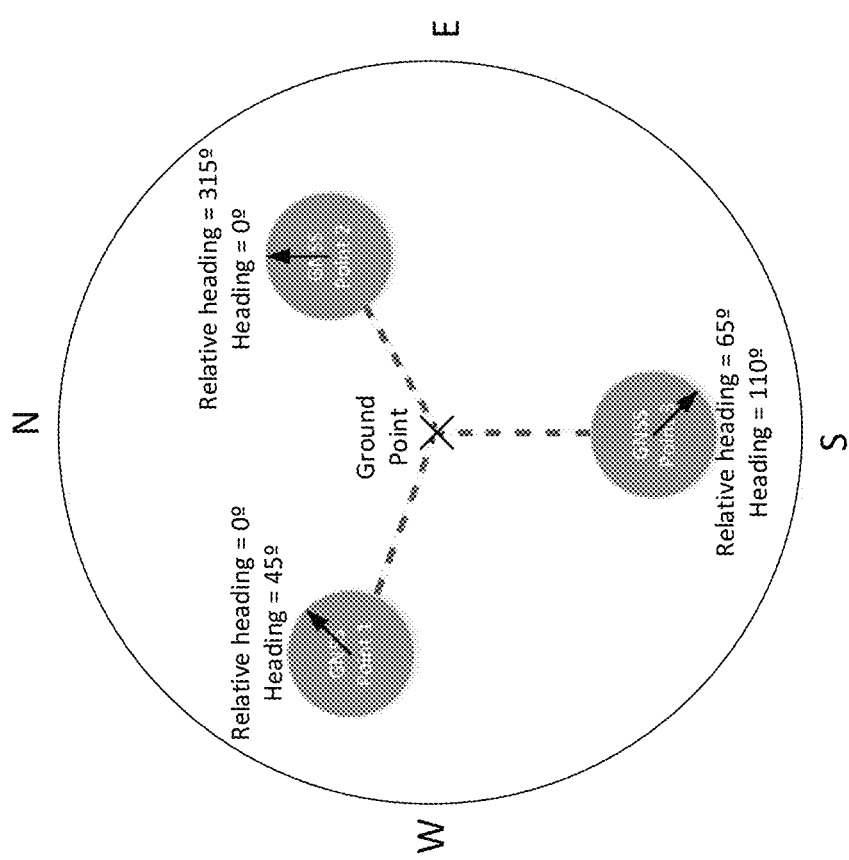
FIG. 21 depicts the process of determining the absolute heading using the data sets of three orientation samples.

FIG. 21 depicts the process of determining the absolute heading using the data sets of three sampling points, or attitudes. In this aspect, the absolute heading angle θ, or the angle with respect to the geographic north, is determined based on pitch, roll, vertical projection, and horizontal projection determined from the at least three initial data samples. The heading θ is determined by projecting each GNSS point to the known ground point at each of at least three attitude angles by using a rotation matrix (containing the heading, pitch and roll angles) and using a translation vector (the pole distance):

$$Xg = Xi + RM(\theta,\alpha,\beta) * Tv(0,0,L) \qquad \text{[equation 6]}$$

where L is the (known) pole length 560, α is the (known) pitch angle, β is the (known) roll angle, θ is the (unknown) heading angle, Xi are the (known) GNSS antenna geodetic coordinates 550 of ith-step, Xg is the (known) geodetic coordinates of the ground point 140 which has to be determined, RM is the rotation matrix and Tv is the translation vector. Once the heading is determined, subsequent position determinations do not need initialization steps and can be performed very fast.

At this point, the process of determining the position and orientation by the surveying pole is completed as the positioning device provides, by a display or some other interface, the coordinates of the ground point, as well as the orientation of the pole, comprising the heading, pitch, and roll angles.

In another aspect of the invention the position and orientation determination process is performed however using more than three candidates. As more sampling points are taken into consideration, the error tolerance in the ground point candidates is reduced and the inherent sensor inaccuracies are filtered out. For example, it has been found out that obtaining data sets from five different attitudes provides the required accuracy. In this optimal aspect, higher accuracy is obtained at the cost of speed, as more measurements are necessary. In the rest of the description, further details are provided, however using the determination of five samples, as an example. The skilled person will understand that the same description can be applied to any number of samples as long as they are data sets obtained from at least three different attitudes.

In another aspect, it has been realized that the inertial sensors exhibit inherent inaccuracies, which propagate and result in further errors in angle determination. Errors can be classified as systematic errors such as bias (for example due to misalignments and temperature effects) and non-systematic errors, such as due to environmental white noise. The inertial sensing means comprises an error compensation mechanism to correct systematic errors, or bias. The bias of inertial sensing means results in inaccuracies in angle determination which end up representing ground point candidates which are also not accurate and suffer from deviations. Moreover, this complicates the accurate determination of the final ground point which is the one candidate which should be the same at the at least three different attitudes, since no candidates completely coincide. Hence, in a further aspect of the invention, the positioning means is calibrated by estimating the bias of the inertial sensor, and iteratively subtracting it from the inertial data readings, resulting in compensated inertial data. The compensated inertial data, free from inherent systematic errors, result in a high degree of accuracy in ground point position and orientation determination.

Next, the inertial sensor bias values are determined by determining a vector of accelerometer bias values based on the following formula:

$$B^b_{accel} = a^b - R_M(\theta,\alpha,\beta) \cdot (0,0,g)^T \qquad \text{[equation 7]}$$

where $B^b_{accel}$ is the (unknown) vector representing the bias of the accelerometer in the body frame. The vector $a^b$ is the (known) mean values of sensed accelerations from the inertial sensor (in a Bfrd configuration) in the first calibration step, $R_M$ is the (known) rotation matrix between the local reference frame and the body reference frame and g is the gravity force equal to 9.81 m/s². In this expression, the accelerometer sensor bias values are determined, in a static position, based on the unique force measured being the gravity force. The force can be distributed in the three axes so a rotation matrix is needed to transform the local reference frame to the body reference frame.

Next, the vector of gyroscope bias values are determined based on the following formula:

$$B^b_{gyro} = w^b - R^b_e \cdot (0,0,w)^T \qquad \text{[equation 8]}$$

where $B_{gyro}$ is the (unknown) vector representing the bias of the gyroscopes in the body frame. The vector $w^b$ is the (known) mean values of sensed angular velocities from the inertial sensor (in a Bfrd configuration) in the first calibration step, $R^b_e$ is the (known) rotation matrix between the Earth Centered Earth Fixed, ECEF, reference frame and the body reference frame and w is the velocity rotation of the earth equal to 15°/h. The gyroscope sensor bias values are determined, in a static position, by knowing that the unique angular rotation measured is the rotation of the earth. The angular velocity can be distributed in the three axes so a rotation matrix is needed to transform the Earth Centered Earth Fixed, ECEF, reference frame to the body reference frame.

Once these bias values are computed, they are subtracted from the inertial data readings in order to compensate for the sensor systematic error using the following formulas. For the accelerometer, the (unknown) vector of corrected accelerations ($a^b_c$) is the subtraction of the previously calculated (known) vector of accelerometer biases ($B^b_{accel}$) from the actual (known) vector of measured accelerations in body frame ($a^b$). An example formula is:

$$a^b_c = a^b - B^b_{accel} \qquad \text{[equation 9]}$$

where, $a^b$ is the vector of measured accelerations in body frame, $B^b_{accel}$ is the vector of accelerometer biases, and $a^b_c$ is the vector of corrected accelerations. For the gyroscopes, the (unknown) vector of corrected angular velocities ($w^b$) is the subtraction of the previously calculated (known) vector of angular velocities biases ($B^b_{gyro}$) from the actual (known) vector of measured angular velocities in body frame ($w^b$). Below, an example of this calculation is shown:

$$w^b_c = w^b - B^b_{gyro} \qquad \text{[equation 10]}$$

where $w^b$ is the vector of measured angular velocities in body frame, $B^b_{gyro}$ is the vector of angular velocities biases, and $w^b_c$ is the vector of corrected angular velocities.

Hence, by using the error corrected inertial data, the ground position and orientation angles α, β, θ of the pole are more accurately determined. In the following, the description comprises the error correction, however, as mentioned, the pole orientation and position determination may also be used without error correction mechanism described, however it will not be as accurate.

Figure 7:
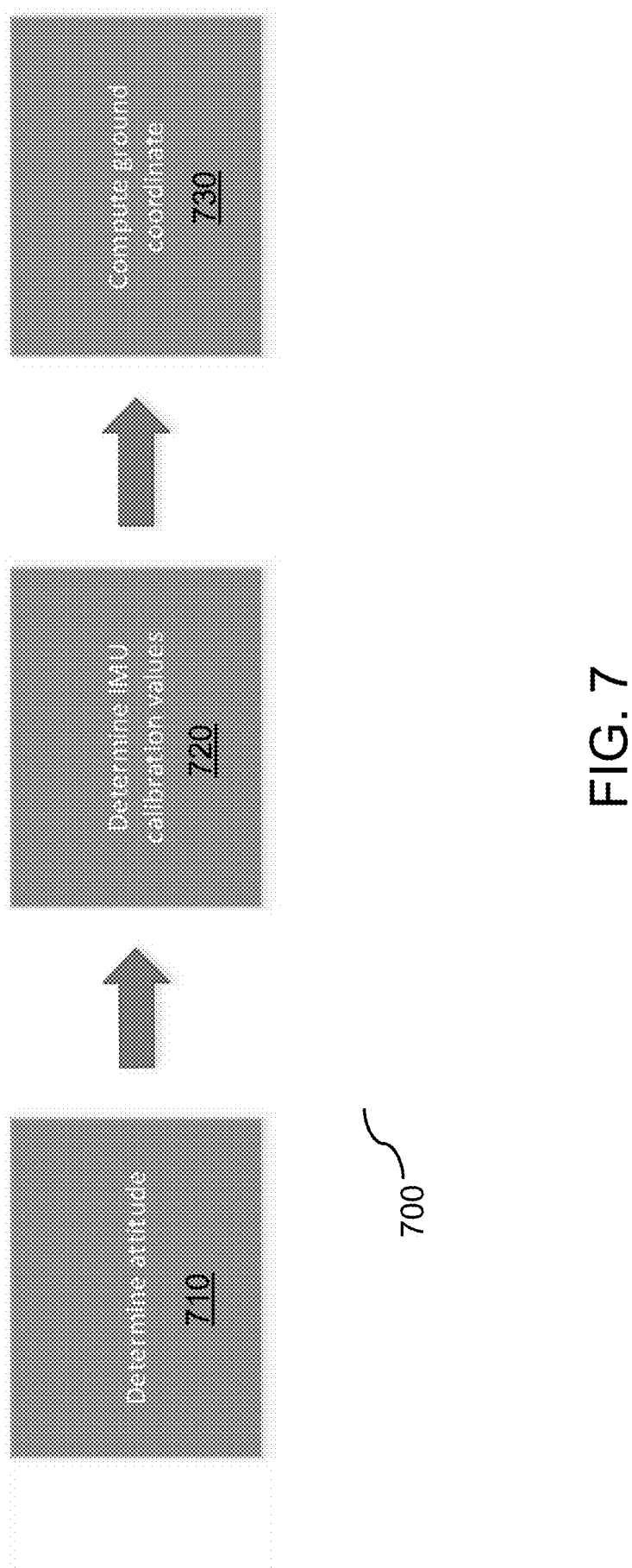
FIG. 7 depicts a method for position determination using the improved positioning pole of the invention.

FIG. 7 depicts a method 700 for determining the initial values of the ground coordinates comprising the error-correction mechanism. In a first initialization step, the attitude, or three dimensional pole orientations, is determined 710. In a second step, the inertial sensor calibration values are determined 720. In a third step, the ground point coordinates are determined 730 based on the determined attitude and calibration values.

Figure 8:
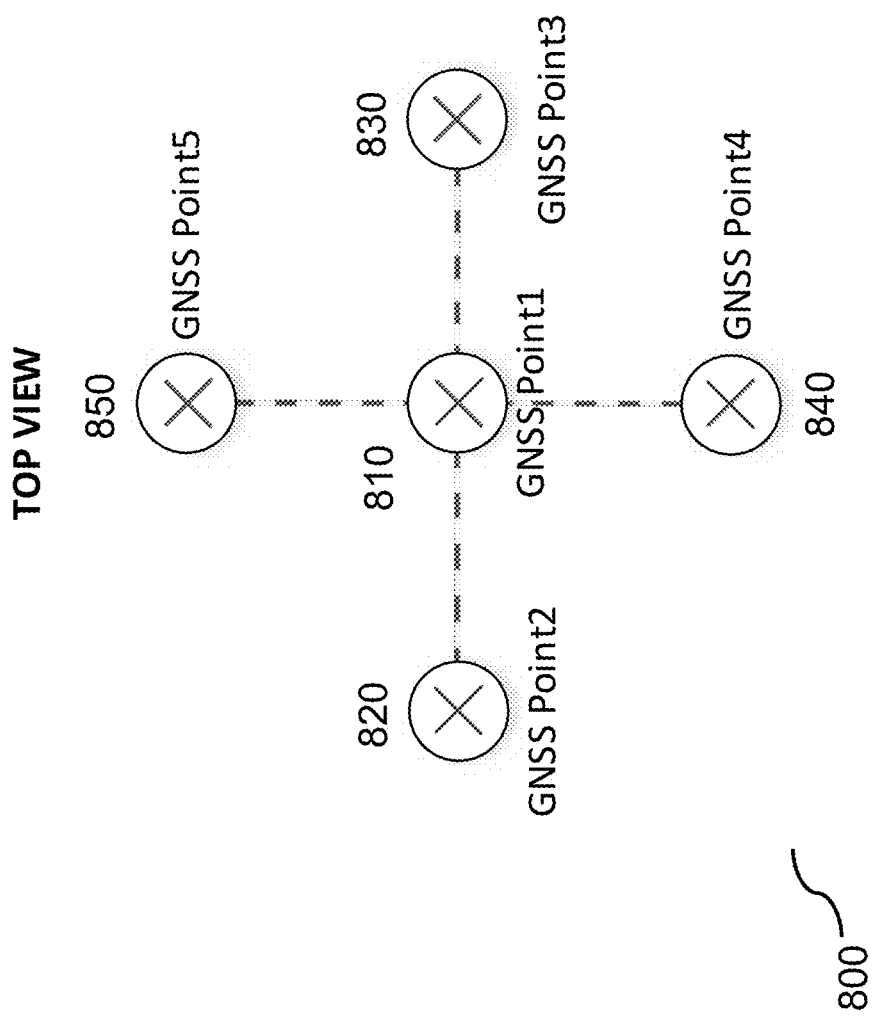
FIG. 8 depicts a top view of the positioning pole movement in an initialization phase.

The attitude determination algorithm 710 comprises determining the orientation parameters of the positioning pole 500, that is, determining the heading angle θ, the pitch angle α and the roll angle β. FIG. 8 depicts visually the pole movement (top view of the pole) in the aspect comprising sampling five data sets, where a first GNSS position is determined at a first position 810, then a second GNSS position is determined at a second position 820, then a third GNSS position is determined at a third position 830, then a fourth GNSS position is determined at a fourth position 840, and a fifth GNSS position is determined at a fifth position 850. The user is prompted to change positions by an indicator, such as an LED, vibrator, or on a GUI screen, which has a first processing mode indicating the position is being determined, and a second change mode, indicating to tilt the pole. The positioning device may also comprise a button for the user to indicate every time the pole has been tilted to one of the required positions, and prompt the positioning device to start its position determination. Instead of a push button, it is also possible for the user to provide this indication via some other user interface, such as keyboard, mouse, or GUI on flat screen, or similar. In the following, each step of the initialization phase is described. FIGS. 9 to 13 depict the tilting of the pole in five different positions whilst FIGS. 14 to 18 depict the method steps performed in each of the five positions, respectively. The initialization procedure should be performed on an open-sky situation, with direct line-of-sight contact with GNSS satellites.

Figure 9:
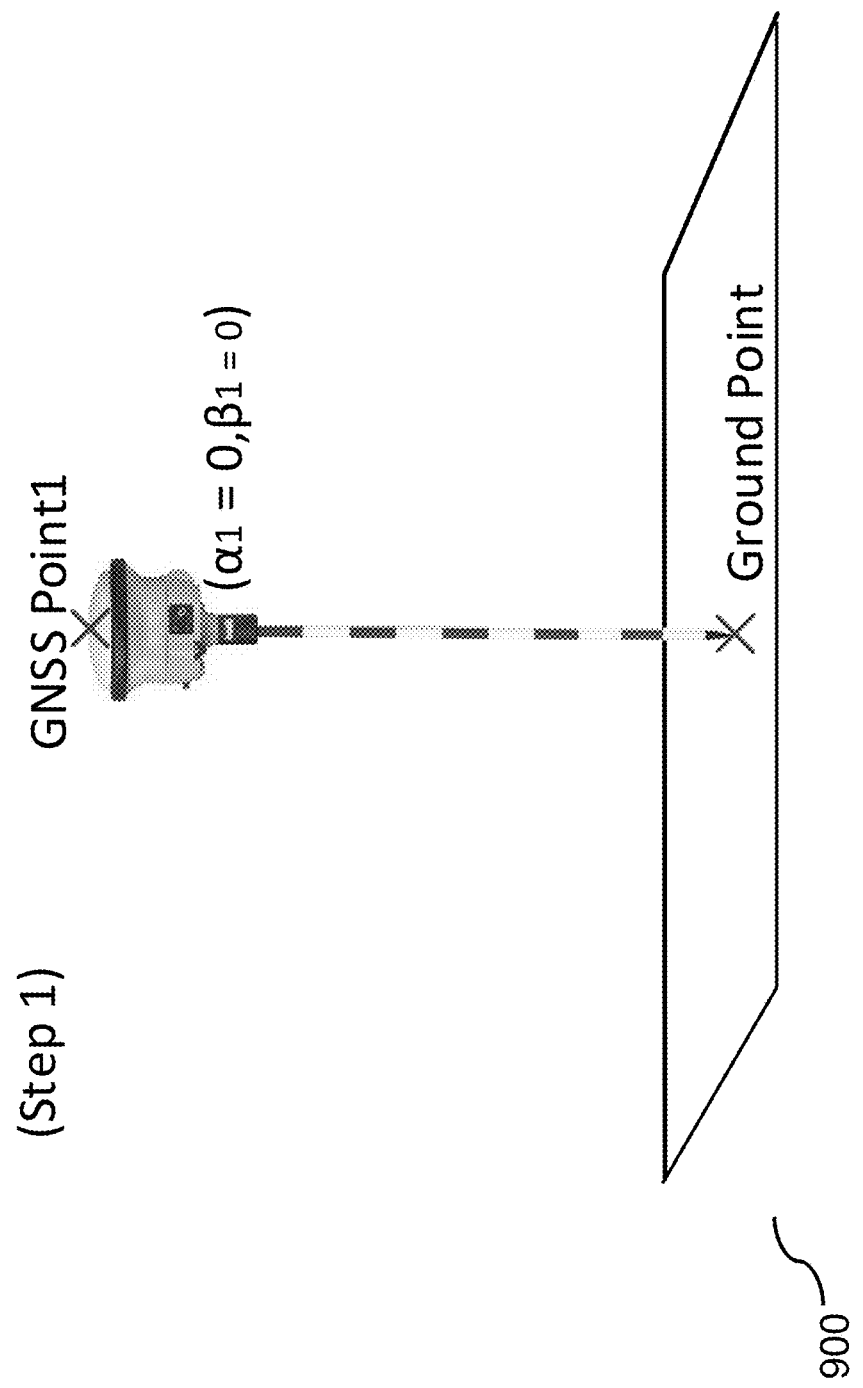
FIGS. 9 to 13 depict part of the initialization procedure using five samples.
Figure 14:
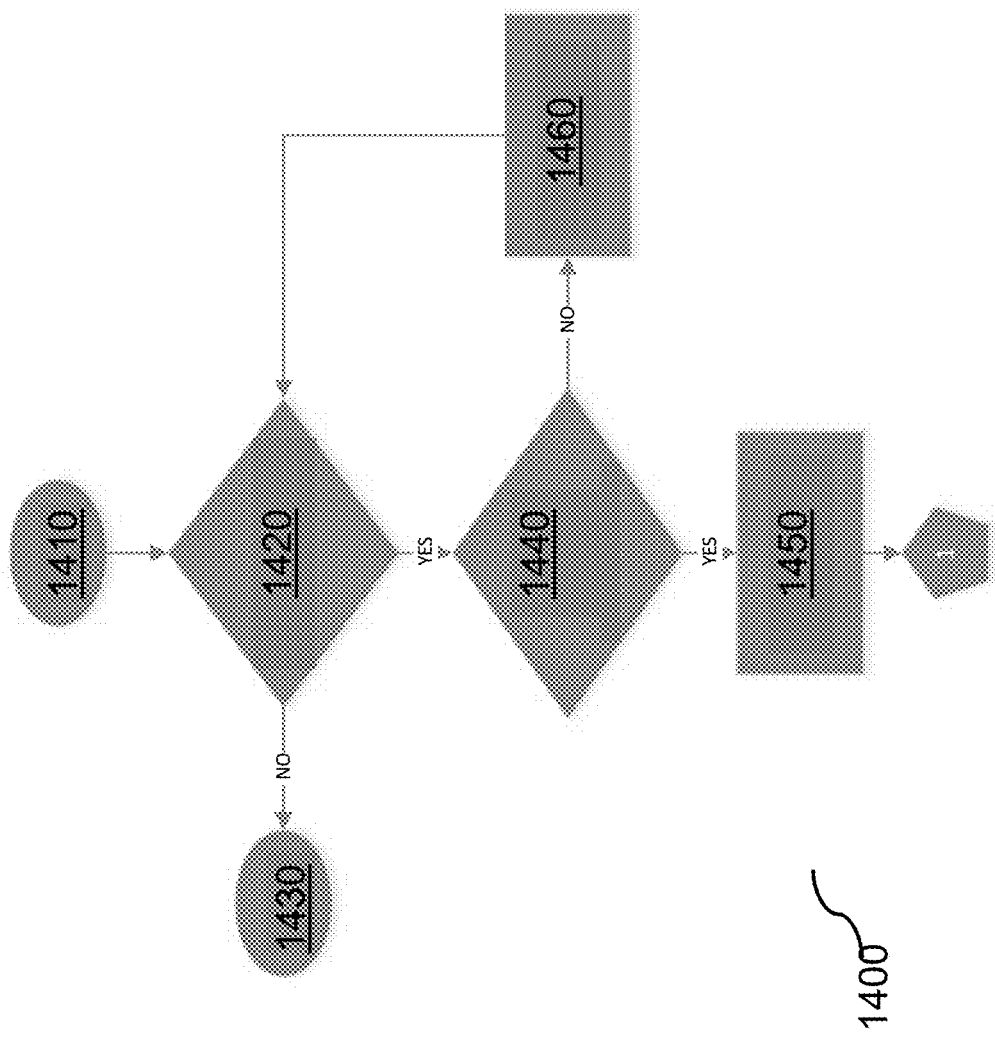
FIGS. 14 to 18 depict the method steps for position determination.

FIG. 9 and FIG. 14 depict the pole in a first position, as the first GNSS position 1 is determined at orientation parameters α1=0 and β1=0, that is completely vertical. Once placed in the first position 1410, the user presses 1420 the button and holds the position during a predetermined time interval T1, for example, of several seconds. In case the button is not pressed for the predetermined time, the algorithm aborts 1430 and awaits the button to be pressed. In case positive, the data from the GNSS point 1 and the inertial sensor data are determined 1440. After the time interval has lapsed, if the data has not been correctly acquired, the LED blinks 1460 RED indicating the user to repeat this step, as depicted by the feedback arrow. Otherwise, the LED blinks 1450 GREEN and proceeds 1 to await the button pressing for the second position.

Figure 10:
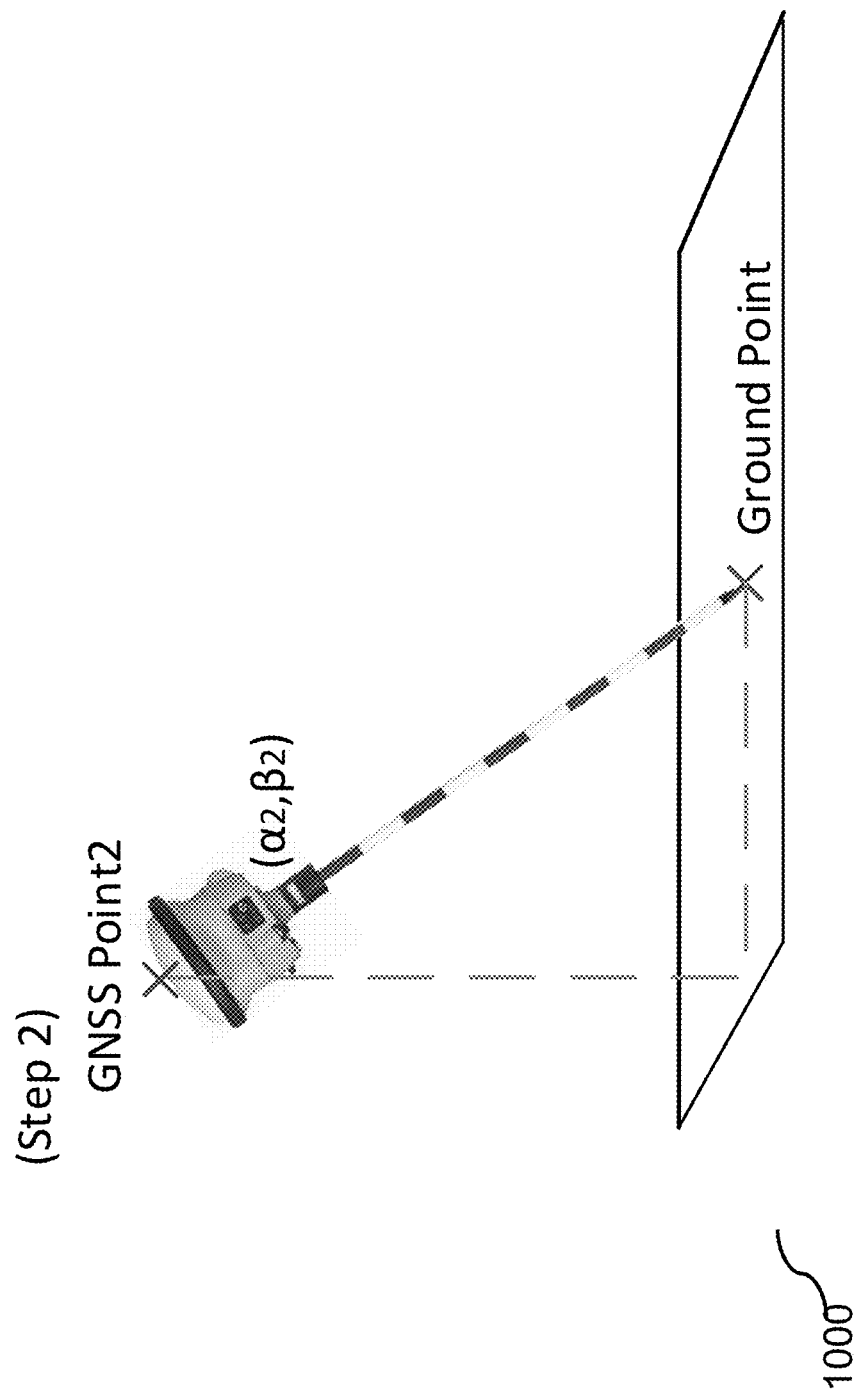
Figure 15:
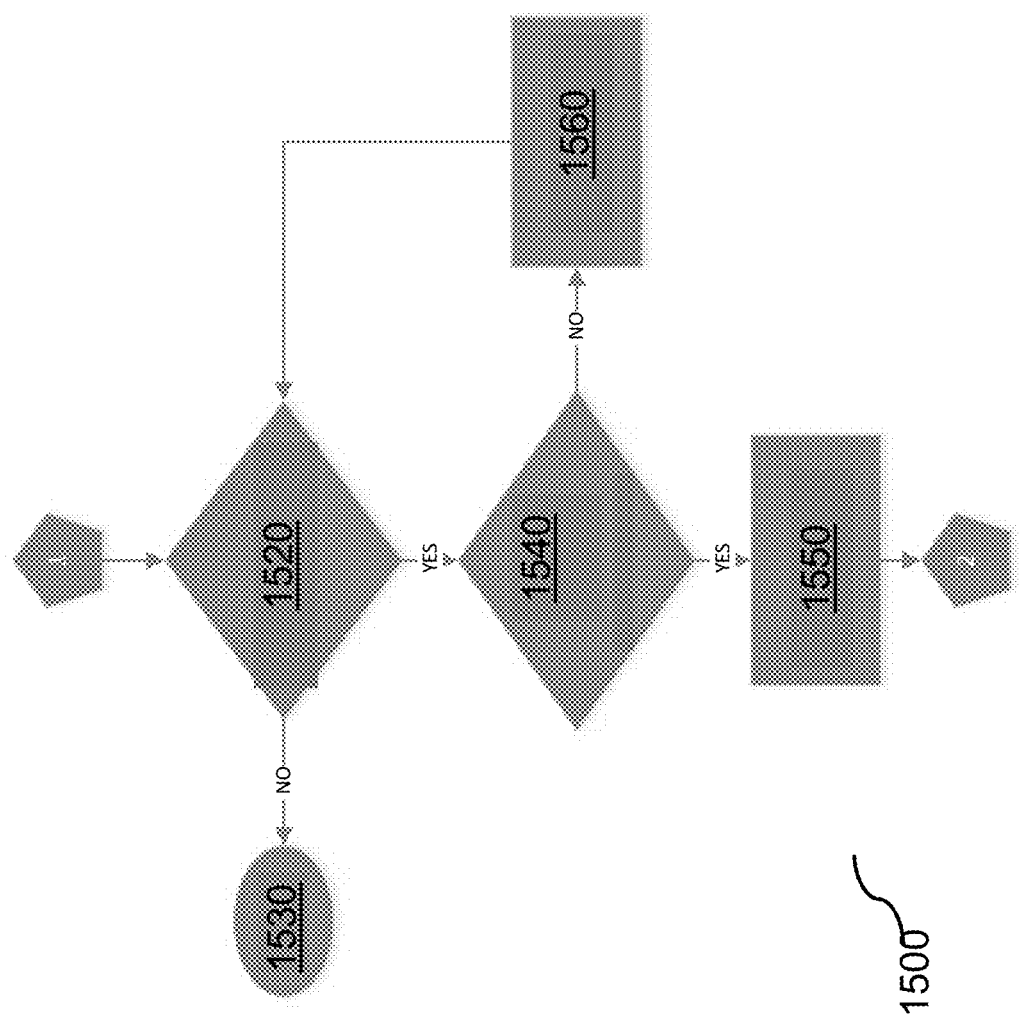

FIG. 10 and FIG. 15 depict the pole in the second position 820, as the second GNSS position 2 is determined at orientation parameters α2 and β2. Here, the user tilts the pole, in any direction, between 20 and 45 degrees. Once placed in the second position, the user presses 1520 the button and holds the position during a predetermined time interval. In case the button is not pressed for the predetermined time, the algorithm aborts 1530 and awaits the button to be pressed. In case positive, the data from the GNSS point 2 and the inertial sensor data are determined. After the time interval has lapsed, if the data has not been correctly acquired, the LED blinks 1560 RED indicating the user to repeat this step, as depicted by the feedback arrow. Otherwise, the LED blinks 1550 GREEN and proceeds 2 to await the button pressing for the third position. Since the pole can be tilted in any direction, this gives the user flexibility in using the pole for position determination, considering the obstacles present in the particular measurement scenario.

Figure 11:
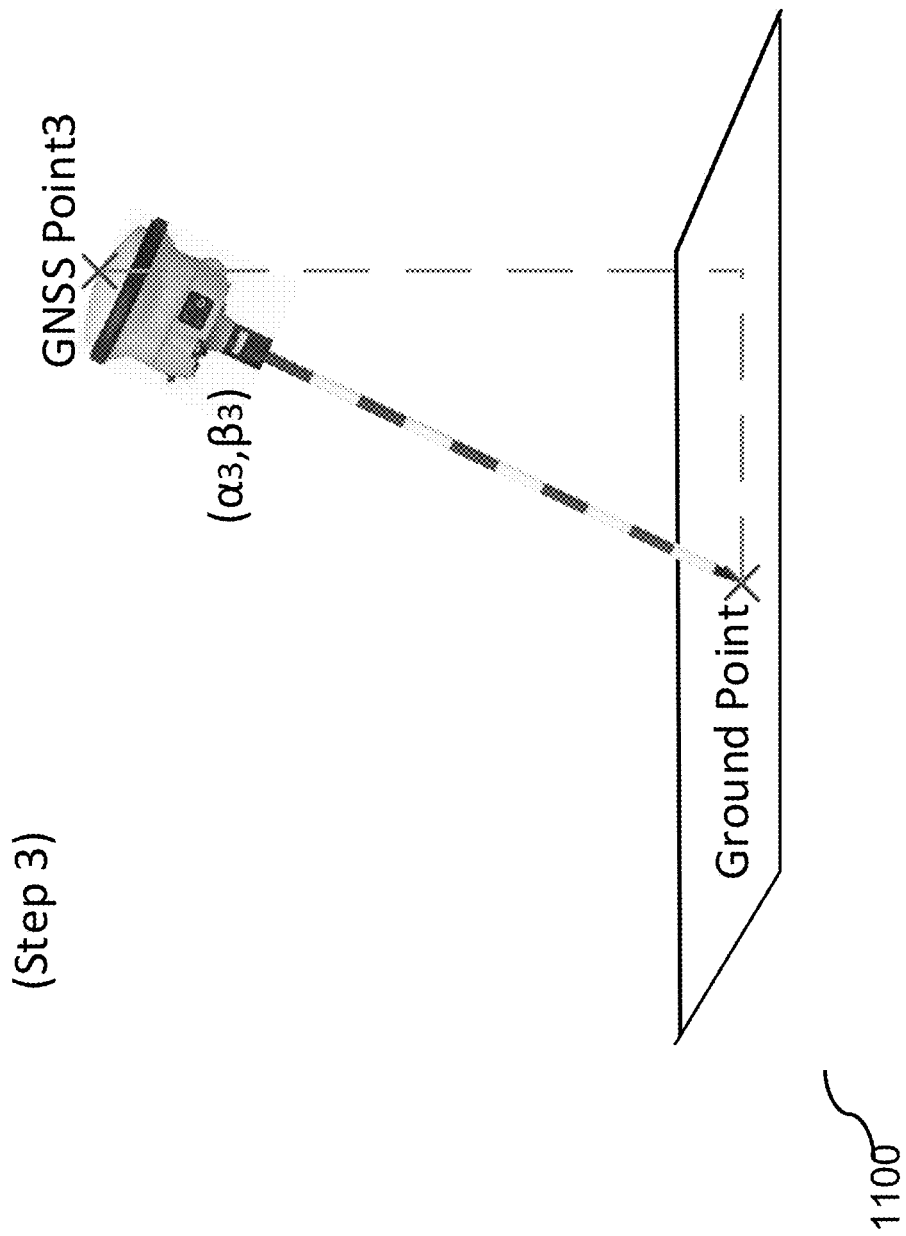
Figure 16:
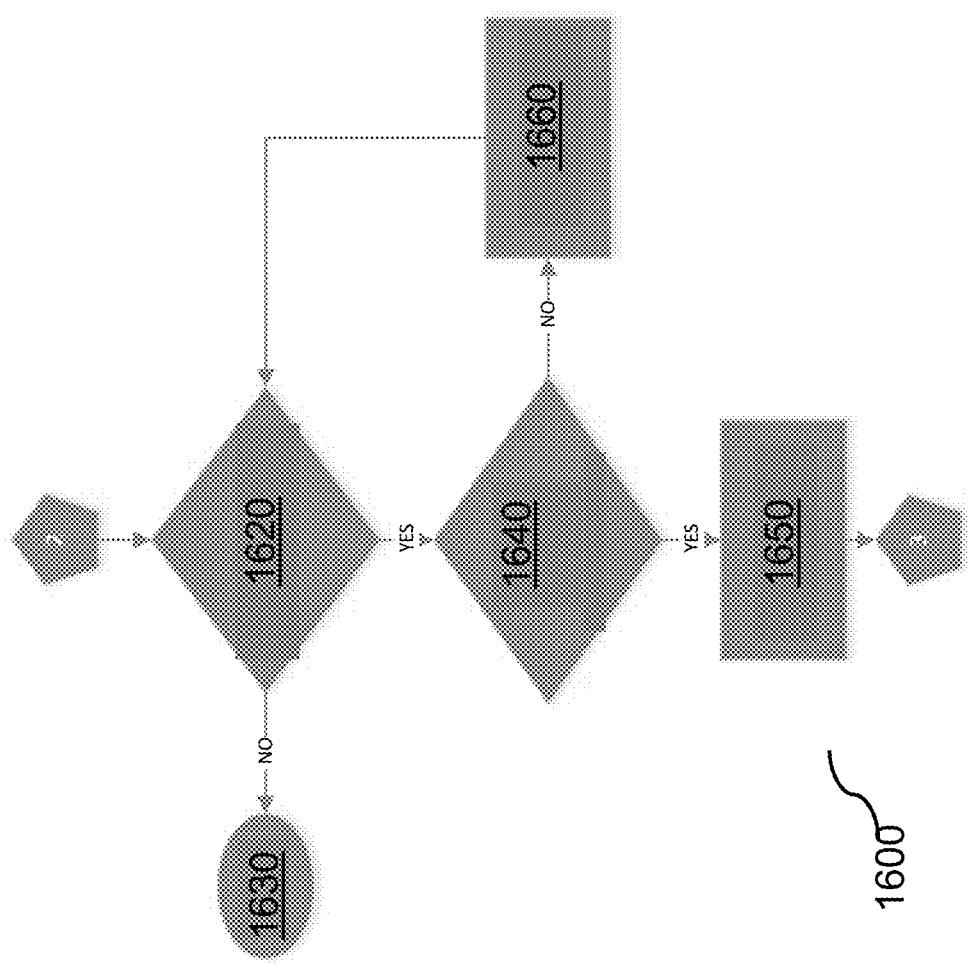

FIG. 11 and FIG. 16 depict the pole in the third position 830, as the third GNSS position 3 is determined at orientation parameters α3 and β3. Here, the user tilts the pole in the opposite direction of the second position, or between 20 and 45 degrees from the vertical in the opposite direction. Once placed in the third position, the user presses the button and holds the position during a predetermined time interval. In case the button is not pressed for the predetermined time, the algorithm aborts 1630 and awaits the button to be pressed.

In case positive, the data from the GNSS point 3 and the inertial sensor data are determined. After the time interval has lapsed, if the data has not been correctly acquired, the LED blinks 1660 RED indicating the user to repeat this step, as depicted by the feedback arrow. Otherwise, the LED blinks 1650 GREEN and proceeds 3 to await the button pressing for the fourth position.

Figure 12:
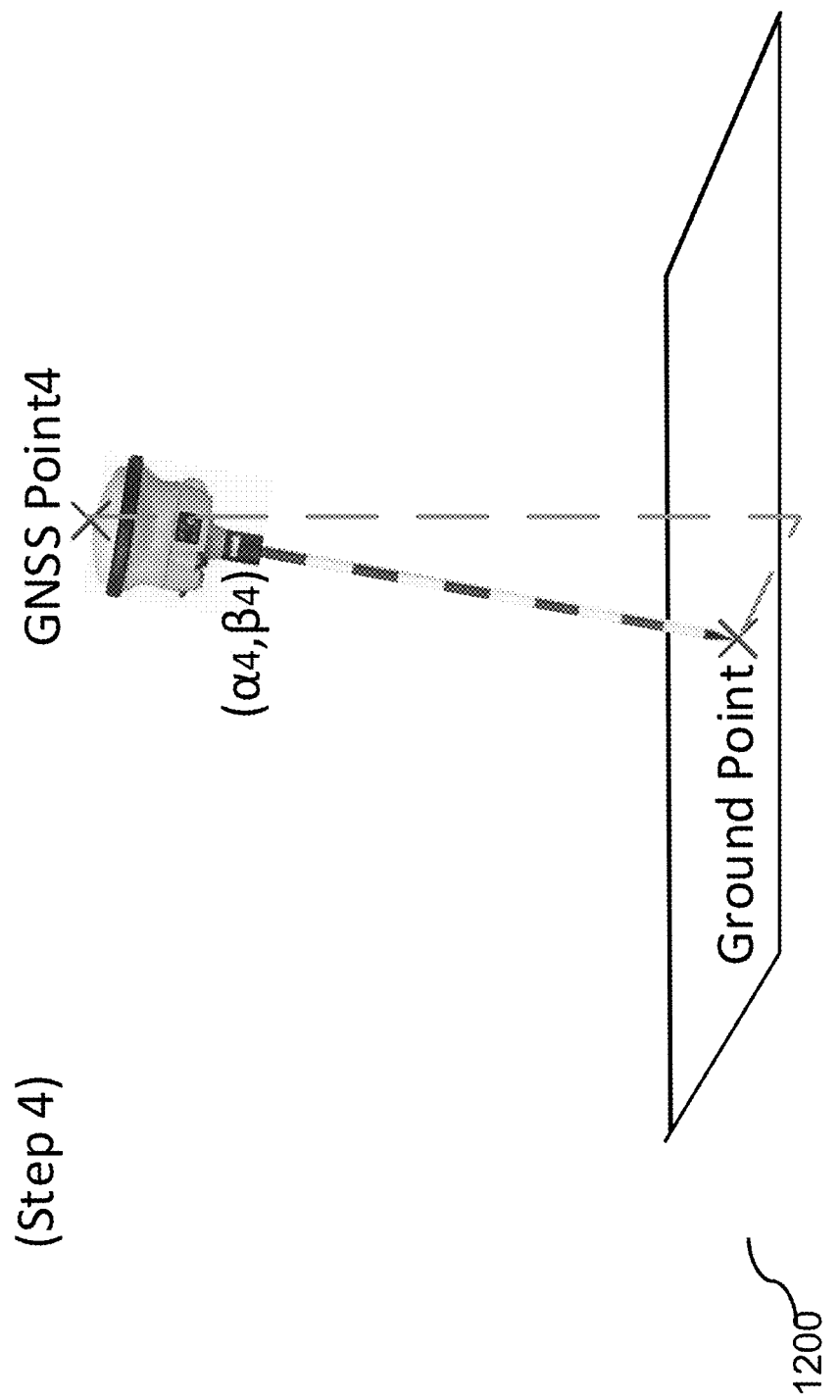
Figure 17:
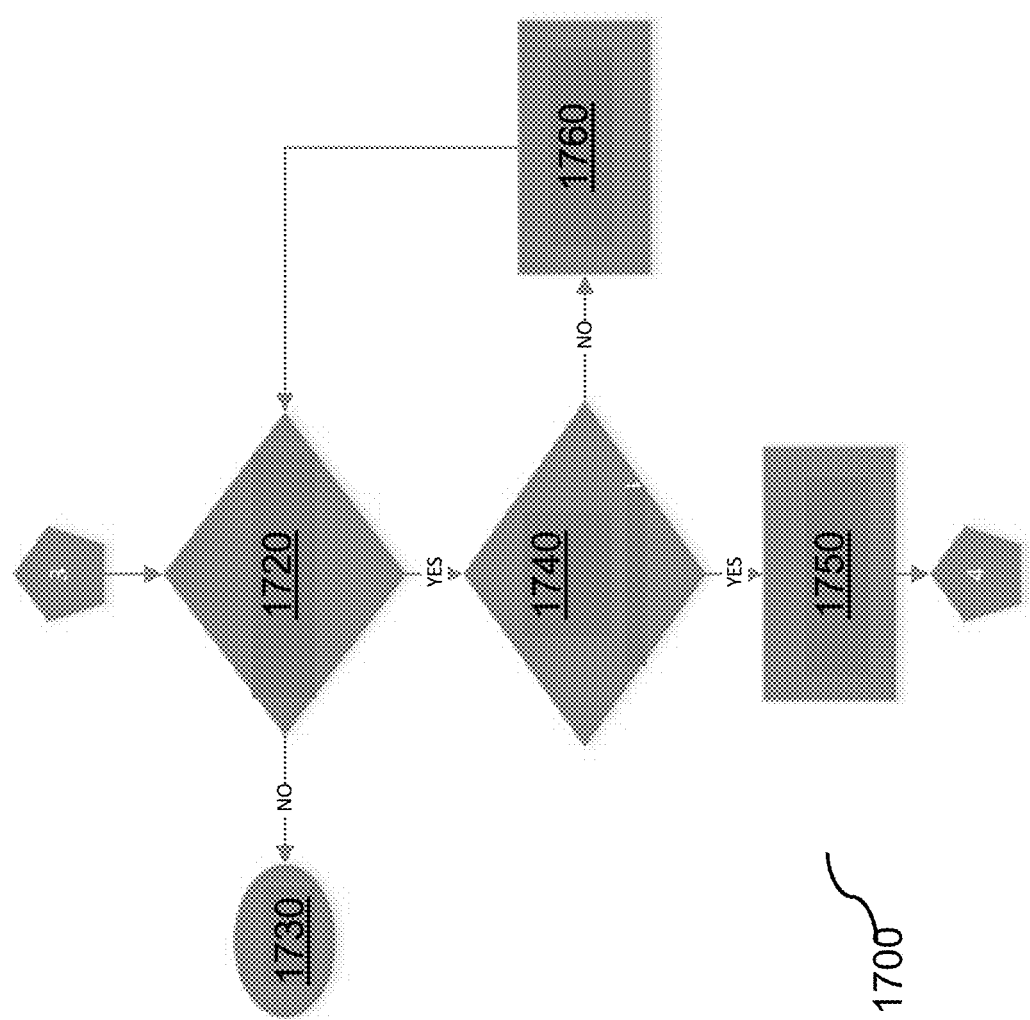

FIG. 12 and FIG. 17 depict the pole in the fourth position 840, as the fourth GNSS position 4 is determined at orientation parameters α4 and β4. Here, the user tilts the pole, between 20 and 45 degrees, in a direction perpendicular to the axis drawn by the second and third positions of the previous steps. Once placed in the fourth position, the user presses the button and holds the position during a predetermined time interval. In case the button is not pressed for the predetermined time, the algorithm aborts 1730 and awaits the button to be pressed. In case positive, the data from the GNSS point 4 and the inertial sensor data are determined. After the time interval has lapsed, if the data has not been correctly acquired, the LED blinks 1760 RED indicating the user to repeat this step, as depicted by the feedback arrow. Otherwise, the LED blinks 1750 GREEN and proceeds 4 to await the button pressing for the fifth position.

Figure 13:
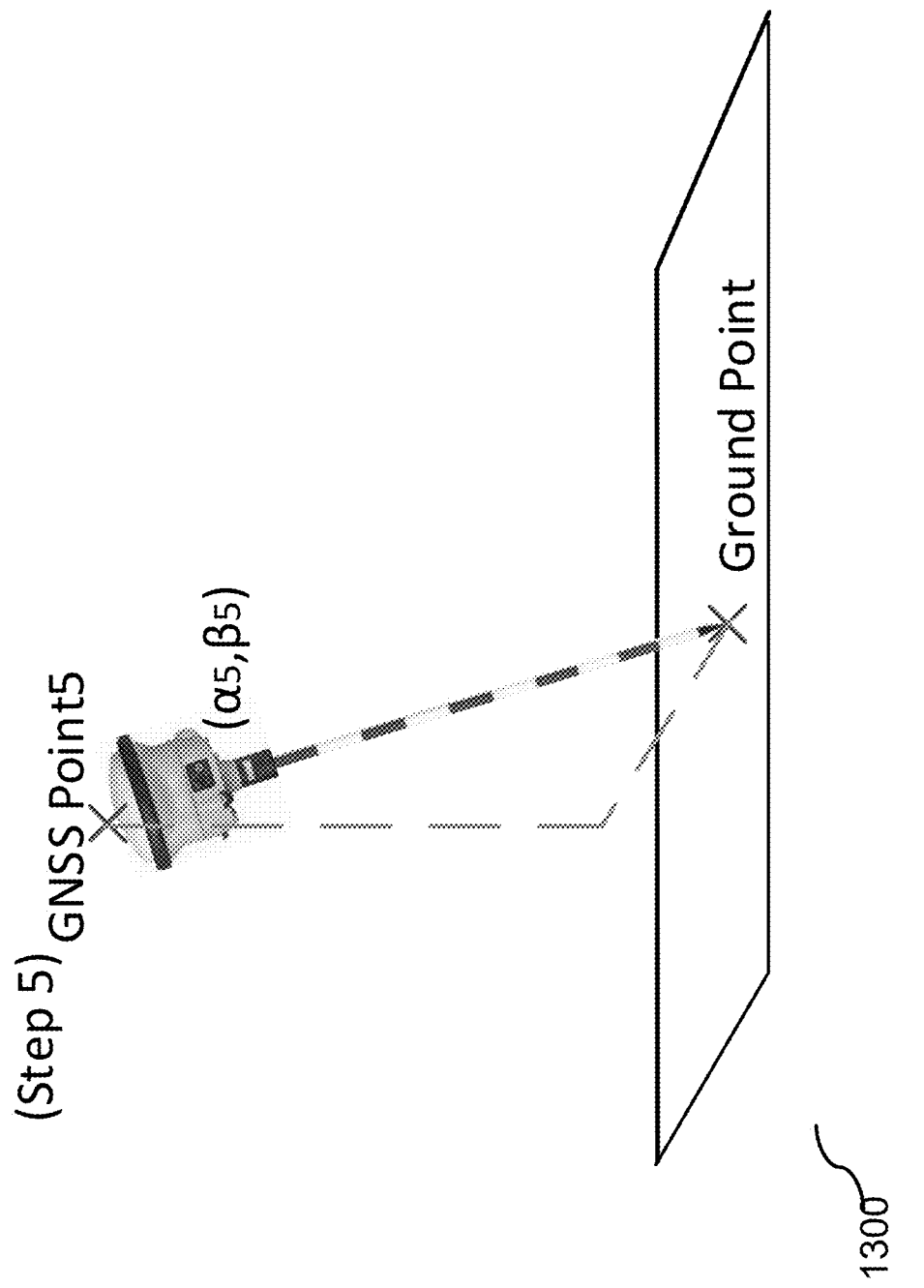
Figure 18:
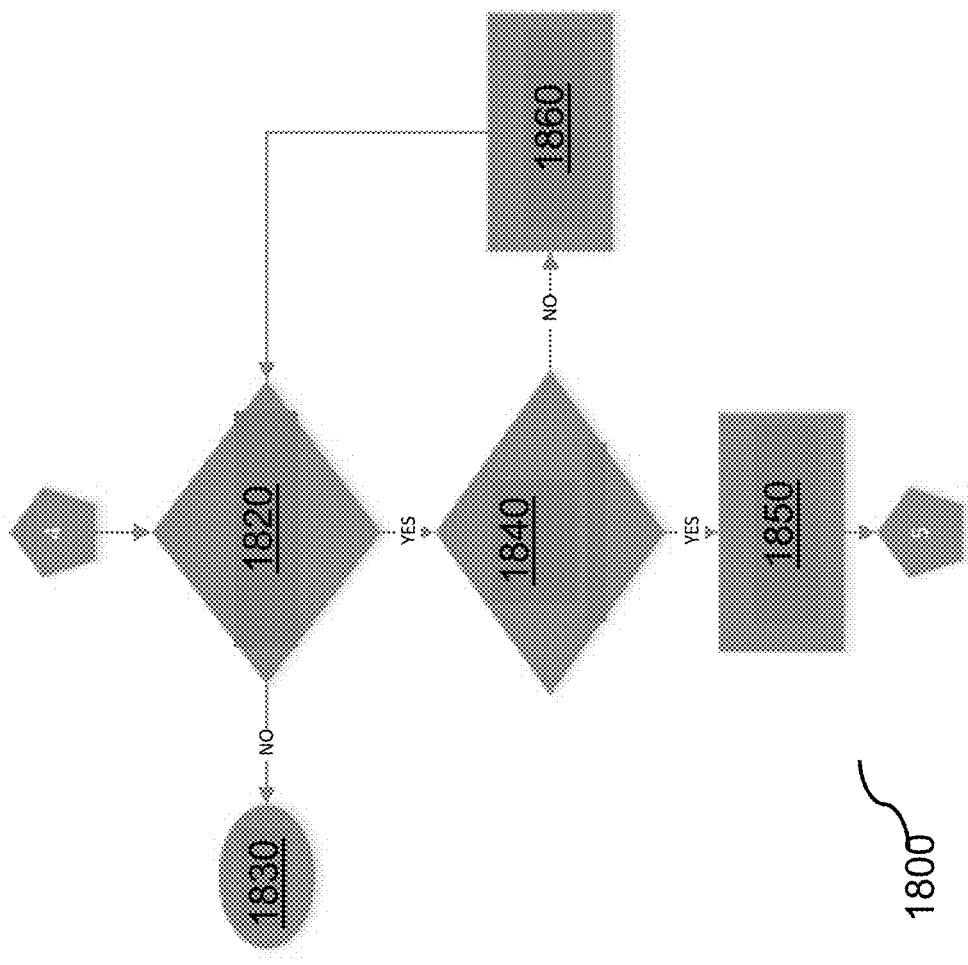

FIG. 13 and FIG. 18 depict the pole in the fifth position 850, as the fifth GNSS position 5 is determined at orientation parameters α5 and β5. Here, the user tilts the pole in the opposite direction of the fourth position, between 20 and 45 degrees from the vertical in the opposite direction. Once placed in the fifth position, the user presses the button and holds the position during a predetermined time interval. In case the button is not pressed for the predetermined time, the algorithm aborts 1830 and awaits the button to be pressed. In case positive, the data from the GNSS point 5 and the inertial sensor data are determined. After the time interval has lapsed, if the data has not been correctly acquired, the LED blinks 1860 RED indicating the user to repeat this step, as depicted by the feedback arrow. Otherwise, the LED blinks 1850 GREEN and proceeds 5 to perform ground point 140 position determination.

Figure 19:
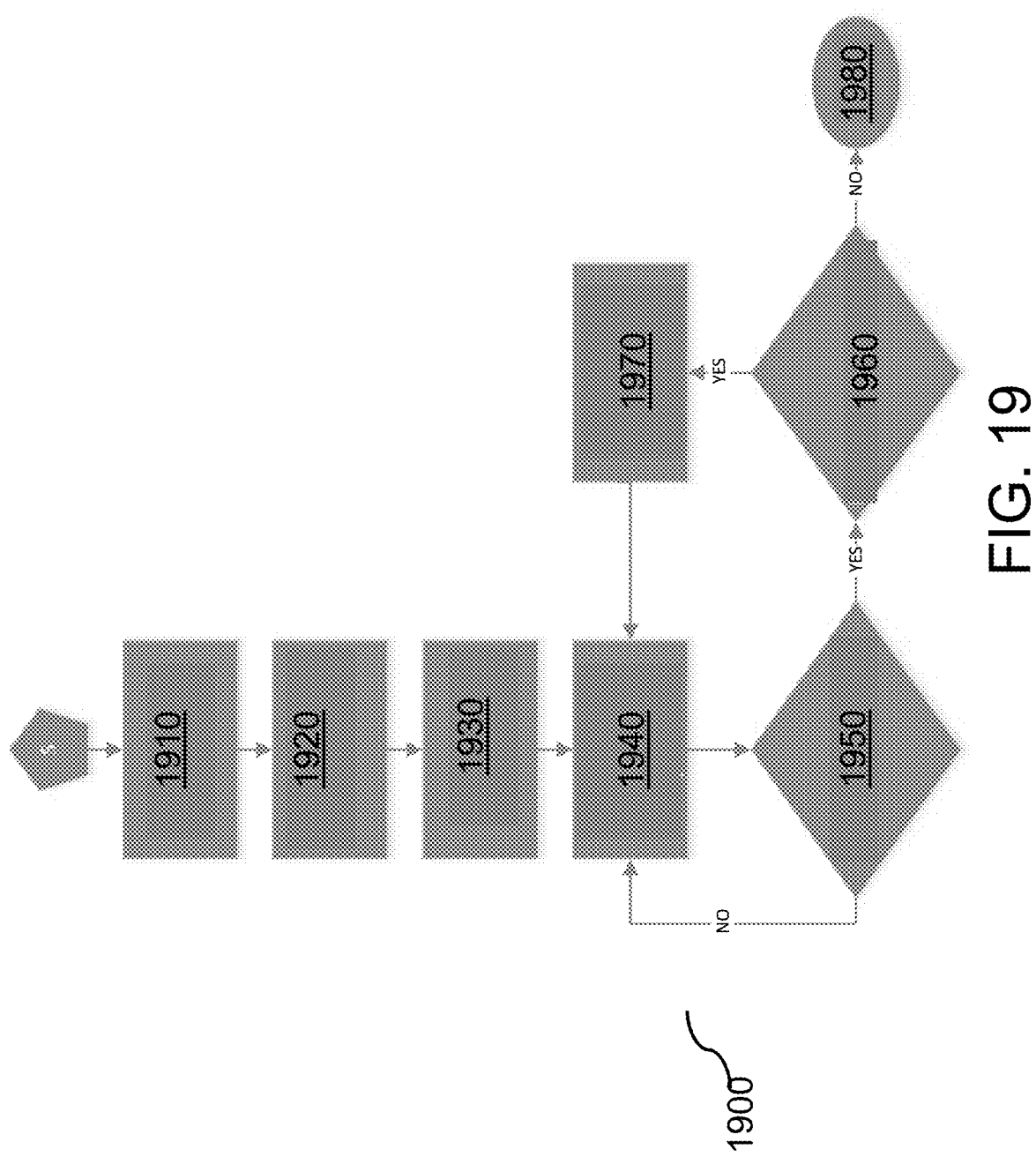
FIG. 19 depicts the steps involved in position determination.

FIG. 19 depicts the steps involved in position determination. In step 1910 a first ground point 140 position estimation is determined. Next, in step 1920, the attitude angles (heading, pitch, roll) are determined. Next, in step 1930, the bias of the inertial sensing means is determined. In step 1940, the first ground point position estimation is updated by taking into account the determined bias resulting in an accurate ground point position 140. This position is then stored in both the local memory storage as well as the internal memory storage 670. It is also made available to the external device. Next, in step 1950, it is determined whether the button is still pressed. In case negative, the ground point position is continually updated 1940.

However, in case positive, in step 1960, it is determined whether the button is being pressed for a second predetermined period of time T2 smaller than T1, indicating that a new ground point position determination is desired. In case positive, in step 1970, a new first ground point determination is performed, as in step 1910, however now this estimation is immediately updated 1940 using the existing attitude angles and bias values. There is no need to repeat the initialization and error bias values as it is assumed that the pole is being used for measuring a different ground point however under the influence of similar electro-magnetic interference for the same scenario. The process ends 1980 when the button is not being pressed anymore, indicating that no further position determination is desired. In case the button is pressed again for a longer predetermined duration T1, the device starts a new initialization and bias estimation process as it is assumed that the scenario has changed and that the pole is under the influence of different electromagnetic interference.

In one aspect, all the steps of the position determination algorithm can be performed in real-time. In another aspect, some of the steps can be performed in a post-processing stage using all the data stored in the various storage means. Also, some or the entire position determination algorithm can be performed locally within the positioning device itself, or also the data exported to any external computing device for performing the required computations.

Therefore the different aspects of the invention described enable fast yet accurate position determination for topographical applications which is resilient to magnetic fields by allowing the positioning pole to be used in any position (not just horizontal) thereby increasing the number of scenarios in which the tool can be used, resulting in a more versatile yet reliable surveying pole (which can be used in complicated environments, such as railways or energy power stations). Moreover, when applied in combination with classical INS/GNSS mechanization equations, an overall faster system initialization and inertial sensor calibration results, yielding a more efficient tool for position determination.

Furthermore, it is to be understood that the embodiments, realizations, and aspects described herein may be implemented by various means in hardware, software, firmware, middleware, microcode, or any combination thereof. Various aspects or features described herein may be implemented, on one hand, as a method or process or function, and on the other hand as an apparatus, a device, a system, or computer program accessible from any computer-readable device, carrier, or media. The methods or algorithms described may be embodied directly in hardware, in a software module executed by a processor, or a combination of the two.

The various means may comprise software modules residing in RAM memory, flash memory, ROM memory, EPROM memory, EEPROM memory, registers, hard disk, a removable disk, a CD-ROM, or any other form of storage medium known in the art.

The various means may comprise logical blocks, modules, and circuits may be implemented or performed with a general purpose processor, a digital signal processor (DSP), and application specific integrated circuit (ASIC), a field programmable gate array (FPGA), or other programmable logic device, discrete gate or transistor logic, discrete hardware components, or any combination thereof designed to perform the functions described. A general-purpose processor may be a microprocessor, but in the alternative, the processor may be any conventional processor, controller, microcontroller, or state machine.

The various means may comprise computer-readable media including, but not limited to, magnetic storage devices (for example, hard disk, floppy disk, magnetic strips, etc.), optical disks (for example, compact disk (CD), digital versatile disk (DVD), etc.), smart cards, and flash memory devices (for example, EPROM, card, stick, key drive, etc.). Additionally, various storage media described herein can represent one or more devices and/or other machine-readable media for storing information. The term machine-readable medium can include, without being limited to, various media capable of storing, containing, and/or carrying instruction(s) and/or data. Additionally, a computer program product may include a computer readable medium having one or more instructions or codes operable to cause a computer to perform the functions described herein.

What has been described above includes examples of one or more embodiments. It is, of course, not possible to describe every conceivable combination, or permutation, of components and/or methodologies for purposes of describing the aforementioned embodiments. However one of ordinary skill in the art will recognize that many further combinations and permutations of various embodiments are possible within the general inventive concept derivable from a direct and objective reading of the present disclosure. Accordingly, it is intended to embrace all such alterations, modifications and variations that fall within scope of the appended claims.

In the following, further examples of the invention are provided. A positioning pole for ground point position determination comprising a rod with a bottom end for placing on the ground point to be determined and position determination means on its top end, the position determination means comprising: satellite positioning means for acquiring the geodetic coordinates of a top end reference point at a certain pole inclination; inertial sensing means for acquiring inertial data of the top end reference point corresponding to the pole inclination; and processing means for determining the coordinates of the ground point as a function of the length of the rod, and the acquired geodetic coordinates and inertial data corresponding to the at least three different rod inclinations. Wherein the position determination means further comprises memory storage means for storing all data acquired and the result of the determinations. Wherein the satellite positioning means comprises a GNSS antenna and a GNSS receiver, and wherein the geodetic coordinates of the top end reference point corresponds to those of the GNSS antenna. Wherein the processing means comprises acquisition means for acquiring the geodetic coordinates from the satellite positioning means and for acquiring the inertial data from the inertial sensing means. Wherein the processing means comprises data processing means for determining the coordinates of the ground point using the data of the acquisition means, wherein the ground point position is determined as a function of the orientation angles of the pole. Wherein the processing means further comprises time-tagging means for time-tagging the position data as well as inertial data and further comprises communication means for delivering the acquired data and/ or the result of the determinations to an external device, and further comprising indicator means for indicating when to tilt the pole in a new inclination attitude and for indicating when the ground point has been determined.

A method of ground point position determination by a positioning pole, the positioning pole comprising a rod with a bottom end for placing on the ground point to be determined and positioning determining means on its top end, the method comprising an initialization phase comprising: acquiring, for at least three different rod inclinations, the geodetic coordinates and inertial data of a top end reference point; and determining the coordinates of the ground point as a function of the length of the rod, and the acquired geodetic coordinates and inertial data corresponding to the at least three different rod inclinations. Wherein the at least three different rod inclinations comprises tilting the top end of the pole while maintaining the bottom end fixed on the same ground point, for three, or at least four, or preferably five different rod inclinations, wherein for the case of three inclinations, the top end at each inclination preferably corresponding to the corners of an equilateral triangle, wherein for the case of four inclinations, the top end at each inclination preferably corresponding to the corners of a square, and wherein for the case of five inclinations, the top end at each inclination preferably corresponding to the corners of a square and its central point. Comprising determining the pitch angle and the roll angle of the pole from the inertial data corresponding to each rod inclination as a function of the medium acceleration measured in the x-axis and y-axis, respectively and wherein the ground point position is determined also as a function of the pitch and roll angles. Comprising determining the absolute heading angle of the pole based on the current pitch angle, the current roll angle and the geodetic coordinates of a previous and current ground points. Further comprising an error correction mechanism comprising estimating inertial sensor bias values and subtracting them from the acquired inertial data values, wherein the bias values are accelerometer bias values and gyroscope bias values. Further comprising a subsequent operational phase without geodetic coordinates and inertial data acquisition, wherein the ground point position is determined as a function of the coordinates of a previous ground point and tracking the differences in pitch, roll, and heading angles.

A method of producing an improved surveying pole from a conventional surveying pole, the method comprising replacing all electronic devices of the conventional pole with a single position determination means placed on the top end of the pole.

A computer program comprising instructions, once executed on a processor, for performing the method steps. A computer readable medium comprising instructions, once executed on a processor, for performing the method steps.

The invention claimed is:

1. A positioning pole for ground point position determination comprising a rod with a bottom end for placing on the ground point to be determined and position determination means on its top end, the position determination means comprising:
    satellite positioning means for acquiring the geodetic coordinates of a top end reference point at a certain pole inclination;
    inertial sensing means for acquiring inertial data of the top end reference point corresponding to the pole inclination; and
    processing means for determining the coordinates of the ground point as a function of the length of the rod, and the acquired geodetic coordinates and inertial data corresponding to at least three different rod inclinations, wherein a plurality of ground point candidates emerge corresponding to each rod inclination and the final ground point position corresponds to the candidate which is common to the at least three different pole inclinations.

2. The pole of claim 1, wherein the position determination means further comprises memory storage means for storing all data acquired and the result of the determinations.

3. The pole of claim 2, wherein the satellite positioning means comprises a GNSS antenna and a GNSS receiver, and wherein the geodetic coordinates of the top end reference point corresponds to those of the GNSS antenna.

4. The pole of claim 3, wherein the processing means comprises acquisition means for acquiring the geodetic coordinates from the satellite positioning means and for acquiring the inertial data from the inertial sensing means.

5. The pole of claim 4, wherein the processing means comprises data processing means for determining the coordinates of the ground point using the data of the acquisition means, wherein the ground point position is determined as a function of the pitch angle and the roll angle of the pole.

6. The pole of claim 4, wherein the processing means further comprises time-tagging means for time-tagging the position data as well as inertial data and further comprises communication means for delivering the acquired data and/or the result of the determinations to an external device, and further comprising indicator means for indicating when to tilt the pole in a new inclination attitude and for indicating when the ground point has been determined.

7. A method of ground point position determination by a positioning pole, the positioning pole comprising a rod with a bottom end for placing on the ground point to be determined and positioning determining means on its top end, the method comprising an initialization phase comprising:
    acquiring, for at least three different rod inclinations, the geodetic coordinates and inertial data of a top end reference point; and
    determining the coordinates of the ground point as a function of the length of the rod, and the acquired geodetic coordinates and inertial data corresponding to at least three different rod inclinations, wherein a plurality of ground point candidates emerge corresponding to each rod inclination and the final ground point position corresponds to the candidate which is common to the at least three different pole inclinations.

8. The method of claim 7, wherein the at least three different rod inclinations comprises tilting the top end of the pole while maintaining the bottom end fixed on the same ground point, for three, or at least four, or preferably five different rod inclinations, wherein for the case of three inclinations, the top end at each inclination preferably corresponding to the corners of an equilateral triangle, wherein for the case of four inclinations, the top end at each inclination preferably corresponding to the corners of a square, and wherein for the case of five inclinations, the top end at each inclination preferably corresponding to the corners of a square and its central point.

9. The method of claim 8, comprising determining the pitch angle and the roll angle of the pole from the inertial data corresponding to each rod inclination as a function of the medium acceleration measured in the x-axis and y-axis, respectively and wherein the ground point position is determined also as a function of the pitch and roll angles.

10. The method of claim 9, comprising determining the absolute heading angle of the pole based on the current pitch angle, the current roll angle and the geodetic coordinates of a previous and current ground points.

11. The method of claim 8, further comprising an error correction mechanism comprising estimating inertial sensor bias values and subtracting them from the acquired inertial data values, wherein the bias values are accelerometer bias values and gyroscope bias values.

12. The method of claim 9, further comprising a subsequent operational phase without geodetic coordinates and inertial data acquisition, wherein the ground point position is determined as a function of the coordinates of a previous ground point and tracking the differences in pitch, roll, and heading angles.

13. A method of producing an improved surveying pole from a conventional surveying pole, the method comprising replacing all electronic devices of the conventional pole with a single position determination means as claimed in claim 1 placed on the top end of the pole.

14. A computer program comprising instructions, once executed on a processor, for performing a method of ground point position determination by a positioning pole, the positioning pole comprising a rod with a bottom end for placing on the ground point to be determined and positioning determining means on its top end, the method comprising an initialization phase comprising:
    acquiring, for at least three different rod inclinations, the geodetic coordinates and inertial data of a top end reference point; and
    determining the coordinates of the ground point as a function of the length of the rod, and the acquired geodetic coordinates and inertial data corresponding to at least three different rod inclinations, wherein a plurality of ground point candidates emerge corresponding to each rod inclination and the final ground point position corresponds to the candidate which is common to the at least three different pole inclinations.

15. A non-transitory computer readable medium comprising instructions, once executed on a processor, for performing a method of ground point position determination by a positioning pole, the positioning pole comprising a rod with a bottom end for placing on the ground point to be determined and positioning determining means on its top end, the method comprising an initialization phase comprising:
    acquiring, for at least three different rod inclinations, the geodetic coordinates and inertial data of a top end reference point; and
    determining the coordinates of the ground point as a function of the length of the rod, and the acquired geodetic coordinates and inertial data corresponding to at least three different rod inclinations, wherein a plurality of ground point candidates emerge corresponding to each rod inclination and the final ground point position corresponds to the candidate which is common to the at least three different pole inclinations.

* * * * *